(12) United States Patent
Funakawa et al.

(10) Patent No.: US 11,339,484 B2
(45) Date of Patent: May 24, 2022

(54) ELECTROLYTIC CELL AND ELECTROLYZER

(71) Applicant: ASAHI KASEI KABUSHIKI KAISHA, Tokyo (JP)

(72) Inventors: Akiyasu Funakawa, Tokyo (JP); Toshinori Hachiya, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 203 days.

(21) Appl. No.: 16/493,105

(22) PCT Filed: Mar. 13, 2018

(86) PCT No.: PCT/JP2018/009771
§ 371 (c)(1),
(2) Date: Sep. 11, 2019

(87) PCT Pub. No.: WO2018/168863
PCT Pub. Date: Sep. 20, 2018

(65) Prior Publication Data
US 2020/0063274 A1 Feb. 27, 2020

(30) Foreign Application Priority Data
Mar. 13, 2017 (JP) .............................. JP2017-047272

(51) Int. Cl.
*C25B 11/04* (2021.01)
*C25B 15/00* (2006.01)
(Continued)

(52) U.S. Cl.
CPC .............. *C25B 11/031* (2021.01); *C25B 9/19* (2021.01); *C25B 11/04* (2013.01); *C25B 15/00* (2013.01)

(58) Field of Classification Search
None
See application file for complete search history.

(56) References Cited

U.S. PATENT DOCUMENTS

| 2006/0042935 A1 | 3/2006 | Houda et al. |
| 2012/0241314 A1 | 9/2012 | Madono et al. |

(Continued)

FOREIGN PATENT DOCUMENTS

| EP | 2816141 A1 | 12/2014 |
| JP | 4846869 | 12/2011 |

(Continued)

OTHER PUBLICATIONS

International Search Report issued in International Patent Application No. PCT/JP2018/009771, dated Apr. 24, 2018.

(Continued)

*Primary Examiner* — Harry D Wilkins, III
(74) *Attorney, Agent, or Firm* — Greenblum & Bernstein, P.L.C.

(57) ABSTRACT

The electrolytic cell according to the present invention is an electrolytic cell including a cathode chamber, the cathode chamber including:
a cathode; and
a reverse current absorbing member having a substrate and a reverse current absorbing body, the reverse current absorbing member being disposed to face the cathode,
wherein the cathode and the reverse current absorbing body are electrically connected, and when the height at the bottom of the cathode chamber is defined as 0 and the height at the top of the cathode chamber is defined as h, the ratio of area S3 of the reverse current absorbing body present at position I corresponding to a height of h/2 or more and h or less to area $S_A$ of the cathode-facing surface of the substrate corresponding to the position I satisfies $0.20 \leq S3/S_A < 1.0$.

19 Claims, 12 Drawing Sheets

(51) Int. Cl.
  *C25B 11/031* (2021.01)
  *C25B 9/19* (2021.01)

(56) References Cited

U.S. PATENT DOCUMENTS

| | | |
|---|---|---|
| 2013/0019179 A1 | 1/2013 | Zhao |
| 2015/0027878 A1 | 1/2015 | Funakawa et al. |
| 2016/0308190 A1 | 10/2016 | Okuda et al. |
| 2018/0245224 A1 | 8/2018 | Takahashi et al. |

FOREIGN PATENT DOCUMENTS

| | | |
|---|---|---|
| JP | 2012-057199 | 3/2012 |
| JP | 5670600 | 2/2015 |
| JP | 2015-115267 A | 6/2015 |
| JP | 2015-183254 | 10/2015 |
| WO | 2004/048643 | 6/2004 |
| WO | 2013/141211 | 9/2013 |
| WO | 2017/188421 | 11/2017 |

OTHER PUBLICATIONS

International Preliminary Report on Patentability issued in International Patent Application No. PCT/JP2018/009771, dated Apr. 24, 2018.
Supplementary European Search Report dated Mar. 17, 2020 issued for EPO Application No. EP 18766625.0.

[Figure 1]
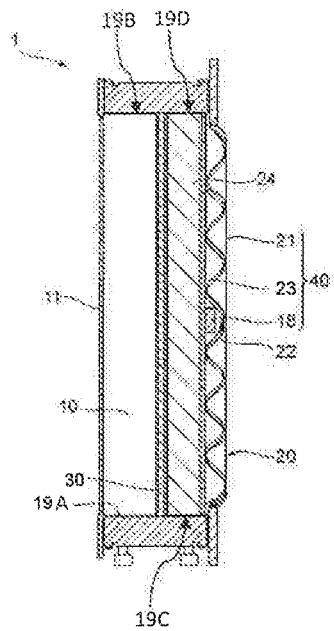
[Figure 2]
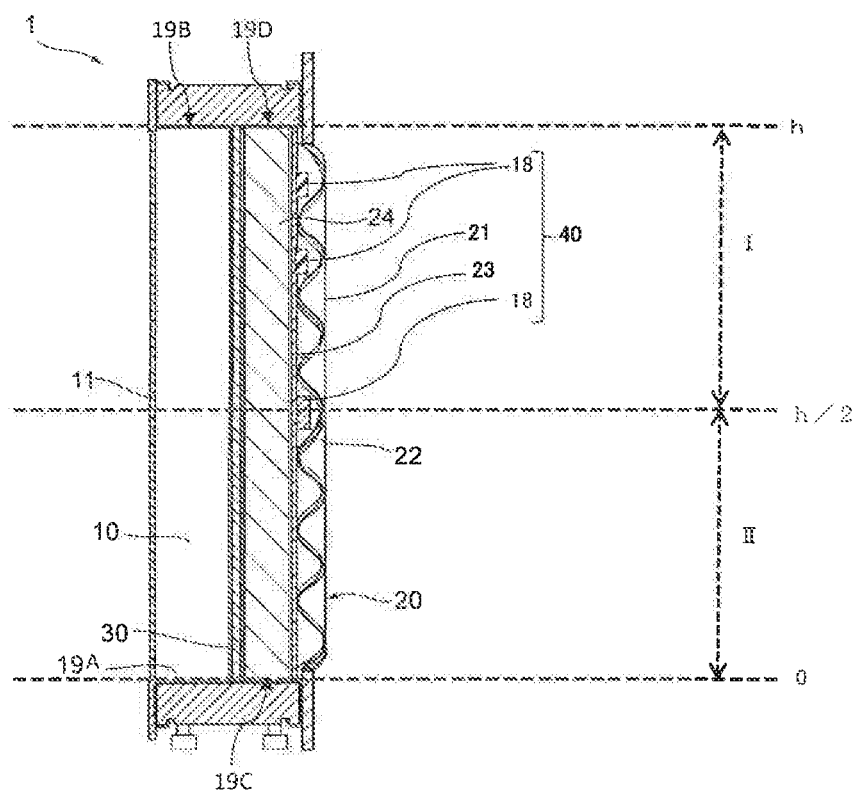

[Figure 3]
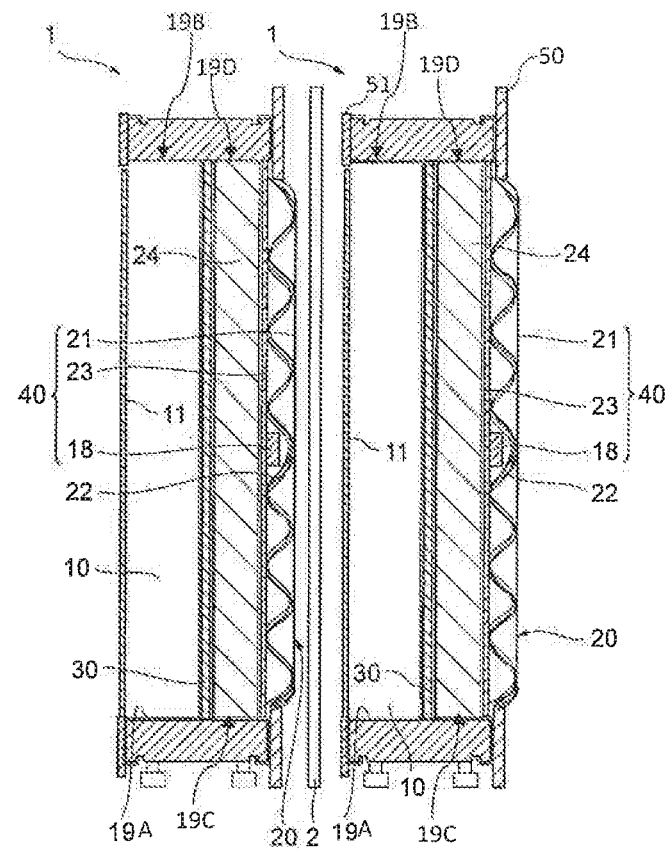
[Figure 4]
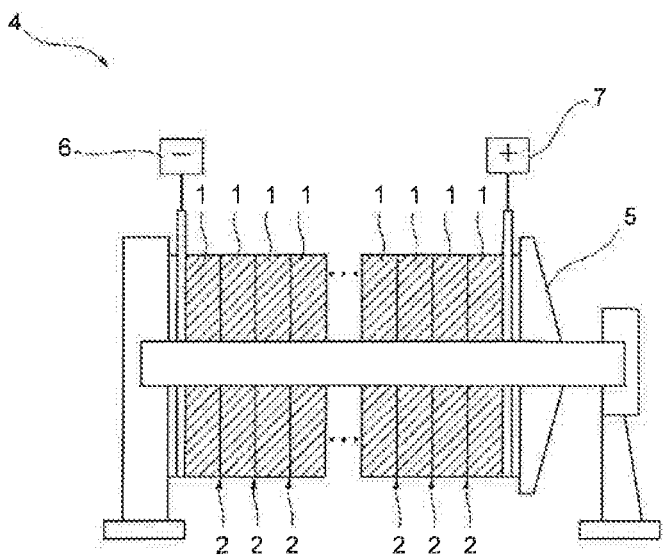

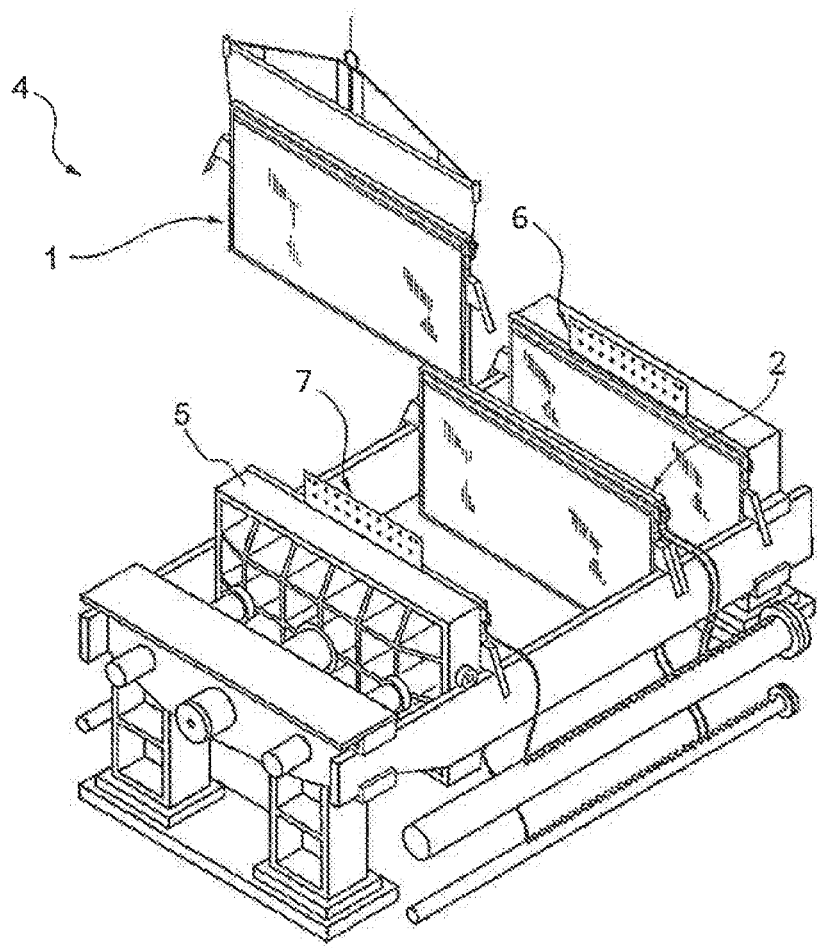
[Figure 5]

[Figure 6]
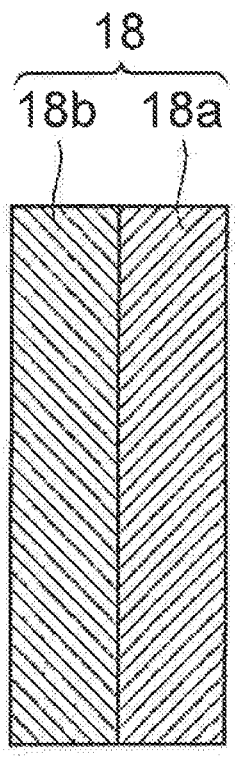
[Figure 7]
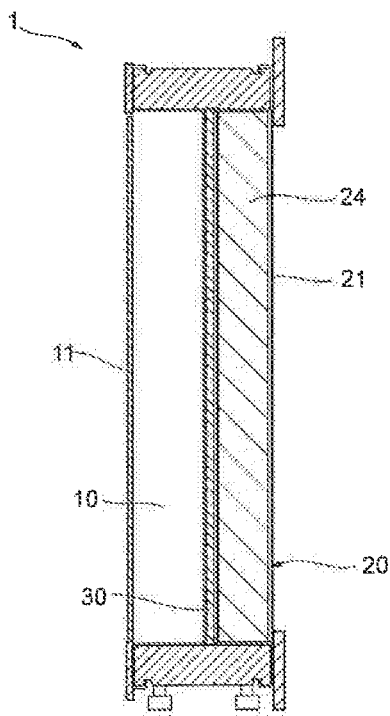

[Figure 8]
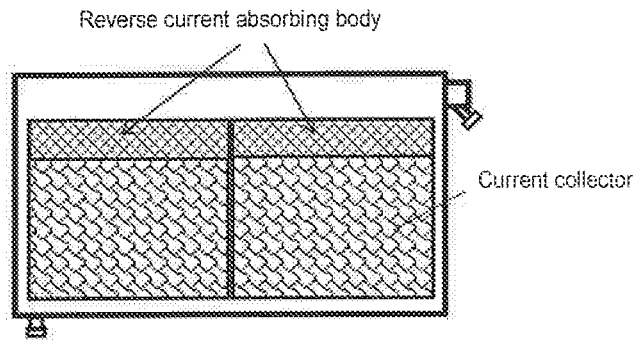
[Figure 9]
| | 200 mm from left end | 545 mm from left end | Center | 545 mm from right end | 200 mm from right end | |
|---|---|---|---|---|---|---|
| | 1 | 7 | 13 | 19 | 25 | —25 mm from top |
| | 2 | 8 | 14 | 20 | 26 | —100 mm from top |
| | 3 | 9 | 15 | 21 | 27 | —200 mm from top |
| | 4 | 10 | 16 | 22 | 28 | —Center |
| | 5 | 11 | 17 | 23 | 29 | —200 mm from bottom |
| | 6 | 12 | 18 | 24 | 30 | —100 mm from bottom |
[Figure 10]
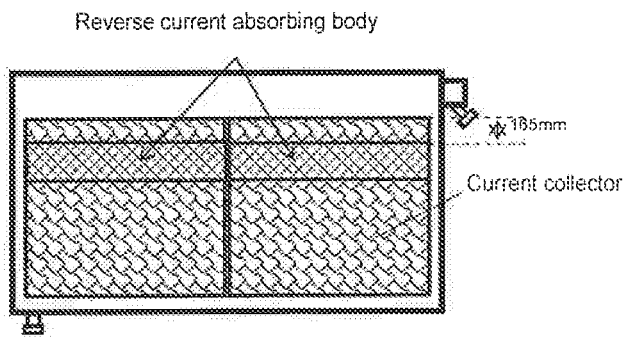

[Figure 11]
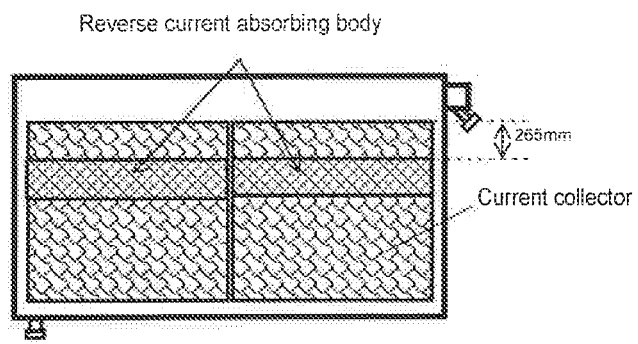
[Figure 12]
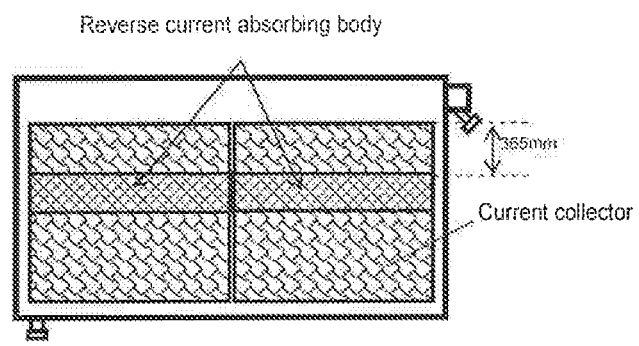
[Figure 13]
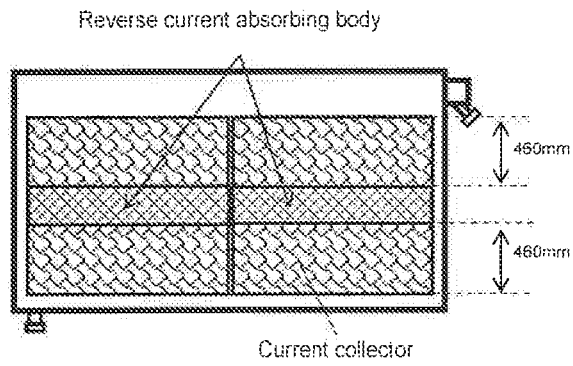

[Figure 14]
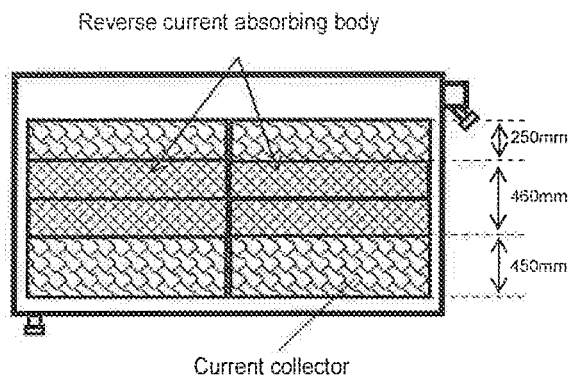
[Figure 15]
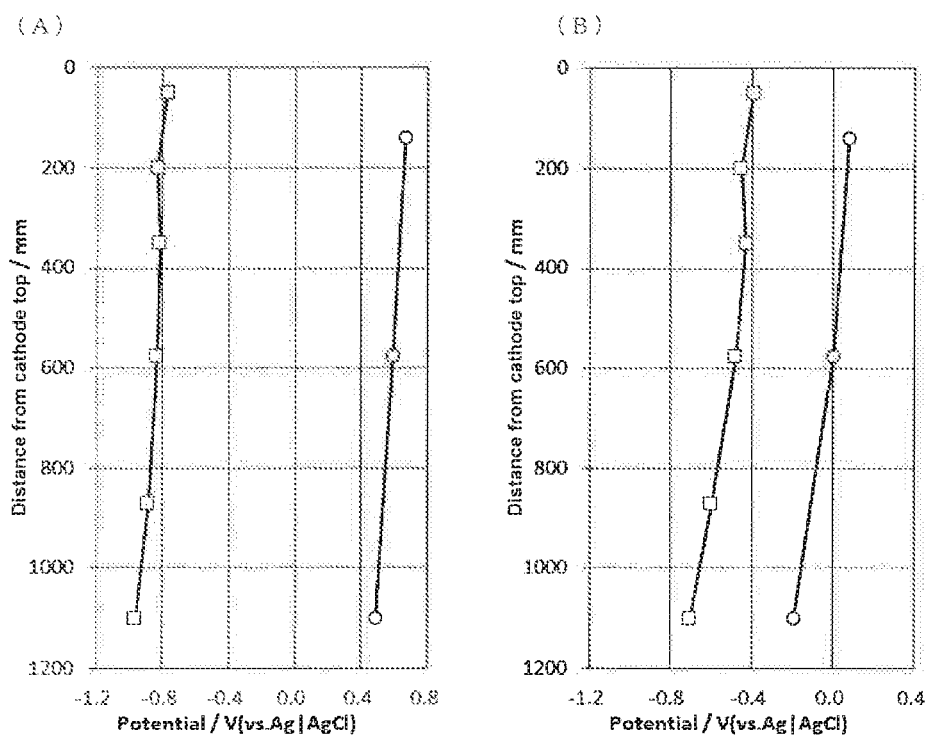

[Figure 16]
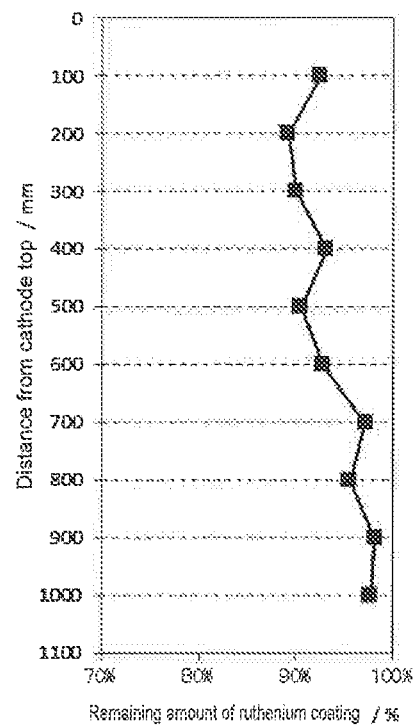
[Figure 17]
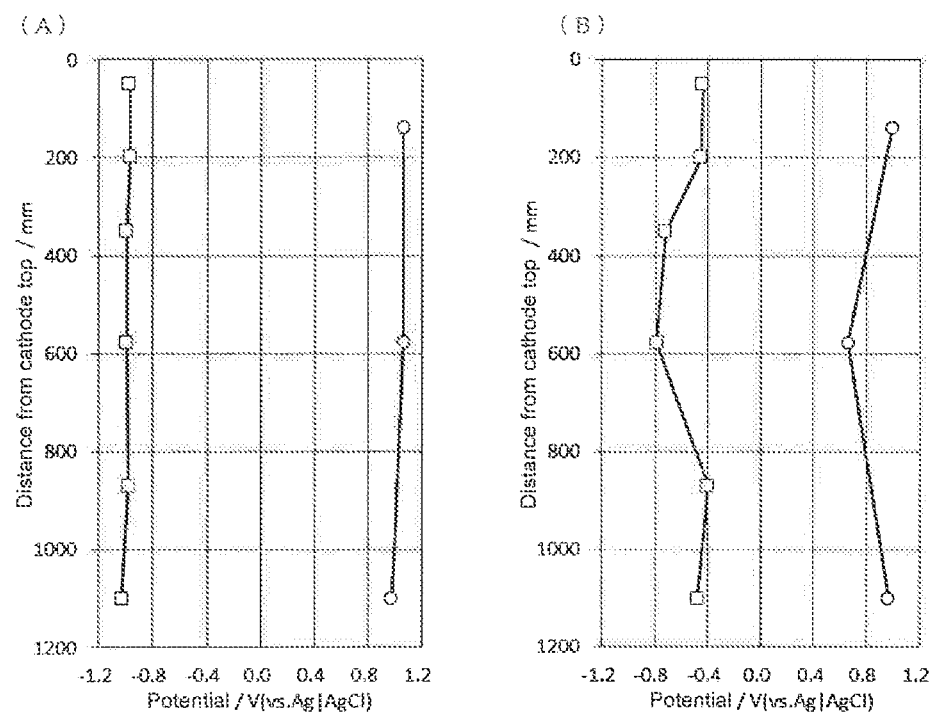

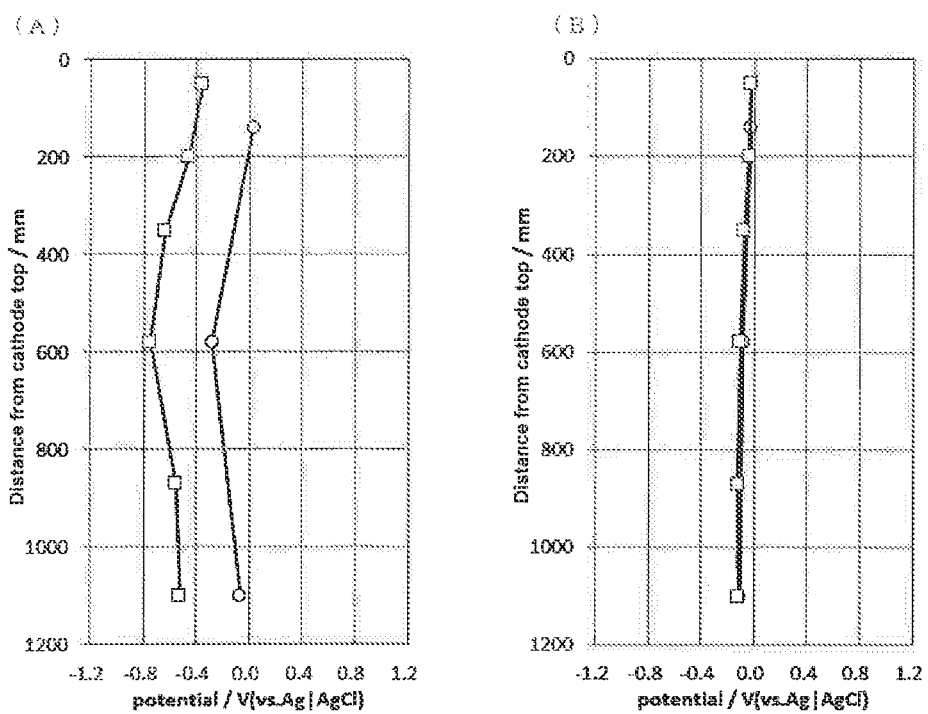
[Figure 18]

[Figure 19]
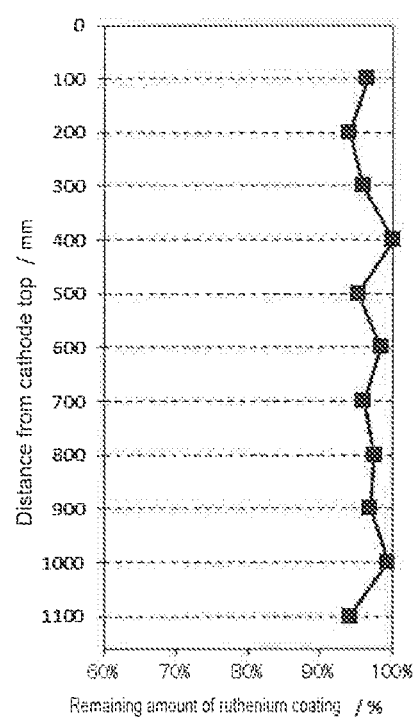

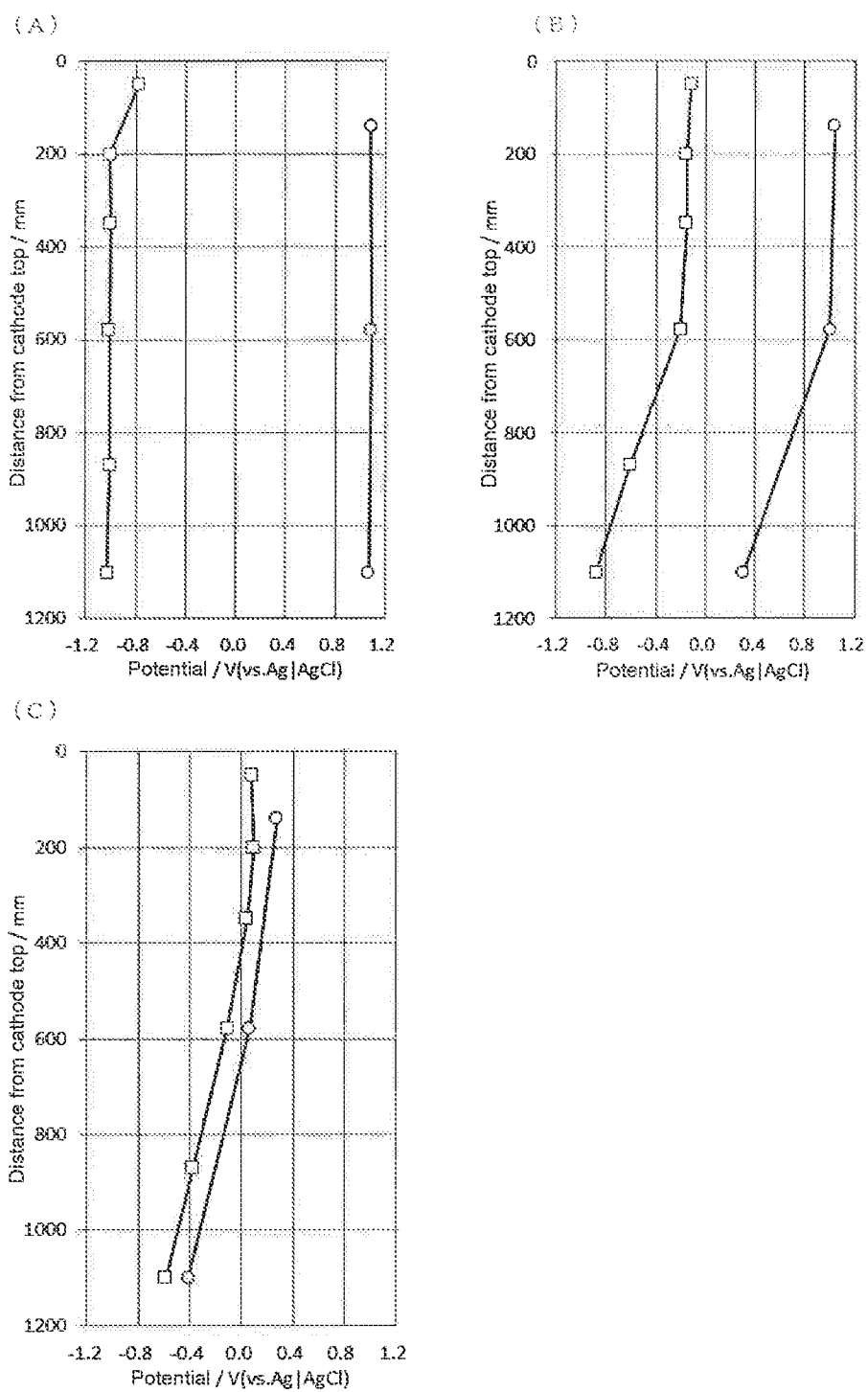
[Figure 20]

[Figure 21]
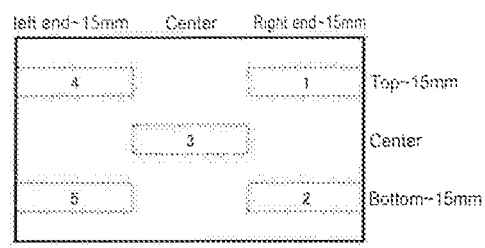

ELECTROLYTIC CELL AND ELECTROLYZER

TECHNICAL FIELD

The present invention relates to an electrolytic cell and an electrolyzer.

BACKGROUND ART

An ion exchange membrane method using an electrolyzer equipped with an ion exchange membrane is mainly used in the electrolytic decomposition (hereinafter, referred to as the "electrolysis") of an aqueous solution of alkali metal chloride such as brine, or water. This electrolyzer is equipped with a large number of electrolytic cells connected in series therein. Electrolysis is performed by interposing an ion exchange membrane between the respective electrolytic cells. A cathode chamber having a cathode and an anode chamber having an anode are disposed back to back via a partition wall (rear plate) or through pressing in the electrolytic cell. Examples of known electrolyzers include an electrolyzer described in Patent Literature 1.

In recent years, the facility of an electrolyzer has been increased in size, and the number of electrolytic cells arranged in series has increased from about 100 to 200 pairs. Along with this, the reverse current (current flowing in the direction opposite to the electrolytic current flowing during a normal operation) generated at the time of stopping tends to increase and thus the degradation of an electrode tends to occur.

In order to prevent the degradation of the electrode, there are two major methods. One of the methods is use of a modified electrode that is not oxidatively degraded even by the flow of the reverse current, and the other method is a contrivance to prevent elevation to an electric potential at which an electrode catalyst is oxidatively degraded.

The former method can be achieved by using, as a catalyst, a component less prone to oxidative degradation in response to the reverse current. However, such a material needs to be resistant to the reverse current as well as to be highly active in hydrogen-generating electrolysis. Any practical material has not yet been developed.

The latter method is usually carried out by performing the operation of substituting a chemical species (chlorine for salt electrolysis) generating the reverse current while applying a weak current before stopping the electrolyzer. However, this electrolysis stopping method poses problems such as complicated operation, and electrode damage or the like due to the trouble of a rectifier for flowing a weak current. Furthermore, the cost of electrolysis increases since such incidental facilities are required, which needs to be improved from an economic point of view. Meanwhile, for example, Patent Literature 2 discloses that the elevation of a cathode potential can be suppressed by the adoption of a cathode structure for electrolysis in which Raney nickel is formed on the surface of a current collector by dispersion plating. Also, Patent Literature 3 discloses a cathode structure for electrolysis in which a layer consuming the reverse current is formed in a cathode chamber by a thermal spraying method.

CITATION LIST

Patent Literature

Patent Literature 1: International Publication No. WO 2004/048643
Patent Literature 2: Japanese Patent No. 4846869
Patent Literature 3: Japanese Patent No. 5670600

SUMMARY OF INVENTION

Technical Problem

However, the application of the technique disclosed in Patent Literature 2 or 3 to an electrolytic cell already under commercial operation or under preliminary storage requires procedures of, for example, temporarily disintegrating the cathode structure, followed by covering with the layer consuming the reverse current and reassembly, or replacing the existing cathode structure with a cathode structure already covered with a reverse current absorbing layer, and thus requires considerable time for such operation. Alternatively, there are disadvantages such as a high cost of a new current collector.

The present invention has been made in light of the problems of the conventional techniques described above. An object of the present invention is to provide an electrolytic cell that is conveniently achievable at a low cost and can suppress the degradation of the cathode by the reverse current generated at the time of stopping electrolysis, the damage of the ion exchange membrane and the elevation of a voltage, a method for producing the electrolytic cell, and an electrolyzer.

Solution to Problem

The present inventors have conducted diligent studies to attain the object and consequently found out that oxidative degradation due to the reverse current can be suppressed, thereby achieving the present invention. In other words, the present invention is as follows.

[1]
An electrolytic cell comprising a cathode chamber, the cathode chamber comprising:
  a cathode; and
  a reverse current absorbing member having a substrate and a reverse current absorbing body, the reverse current absorbing member being disposed to face the cathode,
  wherein the cathode and the reverse current absorbing body are electrically connected, and
  when a height at a bottom of the cathode chamber is defined as 0 and a height at a top of the cathode chamber is defined as h, a ratio of area S3 of the reverse current absorbing body present at position I corresponding to a height of h/2 or more and h or less to area $S_A$ of a cathode-facing surface of the substrate corresponding to the position I satisfies $0.20 \leq S3/S_A < 1.0$.

[2]
The electrolytic cell according to [1], wherein a relationship between area S4 of the reverse current absorbing body present at position II corresponding to a height of 0 or more and less than ½h, and the area S3 in the electrolytic cell satisfies S4<S3.

[3]
The electrolytic cell according to [1] or [2], wherein the reverse current absorbing body comprises an element having an oxidation-reduction potential less noble than that of a catalytic element of the cathode.

[4]
The electrolytic cell according to any of [1] to [3], wherein the reverse current absorbing body comprises at least one element selected from the group consisting of titanium, vanadium, chromium, manganese, iron, nickel, cobalt, copper, zinc, palladium, ruthenium and platinum.

[5]
The electrolytic cell according to any of [1] to [4],
wherein the reverse current absorbing body is a porous body comprising a nickel element, and
a full width at half maximum of a diffraction line peak of Ni metal at a diffraction angle 2θ=44.5° in a pattern obtained in powder X-ray diffraction of the porous body is 0.6° or less.

[6]
The electrolytic cell according to any of [1] to [5], wherein the reverse current absorbing body is a layer comprising Ni or NiO.

[7]
The electrolytic cell according to any of [1] to [6], wherein the reverse current absorbing body is a layer prepared by reducing the NiO.

[8]
The electrolytic cell according to any of [1] to [7], wherein the cathode comprises:
a cathode substrate made of Ni or a Ni alloy, or Fe plated with Ni or a Ni alloy; and
a catalytic layer comprising the catalytic metal, the catalytic layer being formed on the cathode substrate.

[9]
The electrolytic cell according to any of [1] to [8],
wherein the substrate comprises a current collector, a support supporting the current collector, a partition wall, and a baffle plate,
the reverse current absorbing member further comprises a metal elastic body,
the metal elastic body is disposed between the current collector and the cathode,
the support is disposed between the current collector and the partition wall, and
the partition wall, the support, the current collector, the metal elastic body and the cathode are electrically connected.

[10]
The electrolytic cell according to any of [1] to [8],
wherein the reverse current absorbing body comprises a metal plate or a metal porous plate, and a reverse current absorbing layer formed on at least a part of a surface of the metal plate or the metal porous plate,
the substrate comprises a current collector, a support supporting the current collector, and a partition wall,
the reverse current absorbing member further comprises a metal elastic body,
the metal plate or the metal porous plate is disposed between the current collector and the cathode or between the current collector and the partition wall, and
the metal plate or the metal porous plate, the partition wall, the support, the current collector, the metal elastic body and the cathode are electrically connected.

[11]
The electrolytic cell according to [10], wherein the metal plate or the metal porous plate is:
Ni, a Ni alloy; or
Fe, Fe alloy or stainless material, which comprises a Ni- or Ni alloy-coated layer on its surface.

[12]
The electrolytic cell according to any of [9] to [11], wherein at least a part of the reverse current absorbing body is disposed between the metal elastic body and the current collector.

[13]
The electrolytic cell according to any of [9] to [12], wherein at least a part of the reverse current absorbing body is disposed between the current collector and the partition wall.

[14]
The electrolytic cell according to any of [1] to [8],
wherein the cathode chamber comprises, as the substrate, a partition wall and a cathode support supporting the cathode, wherein
the cathode support is disposed between the cathode and the partition wall, and
the partition wall, the cathode support and the cathode are electrically connected.

[15]
The electrolytic cell according to [14], wherein at least a part of the reverse current absorbing body is disposed between the cathode and the partition wall.

[16]
The electrolytic cell according to any of [1] to [15], wherein at least a part of the substrate and/or the metal elastic body is a cube, a cuboid, a plate-like shape, a rod-like shape, a reticular shape, a disk-like shape or a spherical shape.

[17]
The electrolytic cell according to any of [1] to [16], wherein a specific surface area of the reverse current absorbing body is 0.01 to 100 $m^2/g$.

[18]
The electrolytic cell according to any of [1] to [17], wherein an electric quantity absorbed by the reverse current absorbing body is 1,000 to 2,000,000 $C/m^2$.

[19]
The electrolytic cell according to any of [1] to [18], wherein a sum of effective surface areas of the reverse current absorbing body is 10 to 100,000 $m^2$.

[20]
An electrolyzer comprising the electrolytic cell according to any of [1] to [19].

[21]
The electrolyzer according to [20], wherein a distance between an anode and the reverse current absorbing member in the electrolyzer is 35 mm to 0.1 mm.

[22]
A method for producing the electrolytic cell according to any of [1] to [19], comprising
a formation step of forming the reverse current absorbing body on the substrate or the metal elastic body to obtain the reverse current absorbing member,
wherein, after the formation step, the ratio of the area S3 to the area $S_A$ satisfies $0.20 \leq S3/(S_A) < 1.0$.

Advantageous Effects of Invention

The present invention provides an electrolytic cell that is conveniently achievable at a low cost and can suppress the degradation of the cathode by the reverse current generated at the time of stopping electrolysis, the damage of the ion exchange membrane and the elevation of a voltage, a method for producing the electrolytic cell and an electrolyzer.

BRIEF DESCRIPTION OF DRAWINGS

FIG. 1 shows a schematic cross-sectional view showing an example of a first aspect of the electrolytic cell according to the present embodiment.

FIG. 2 shows an illustrative view showing the heights of a cathode in the electrolytic cell by means of auxiliary lines in the example shown in FIG. 1.

FIG. 3 shows an illustrative view of the case where two electrolytic cells of FIG. 1 are connected in series.

FIG. 4 shows an illustrative view showing an example of an electrolyzer comprising the electrolytic cell of the present embodiment.

FIG. 5 shows an illustrative view showing an example of the process of assembling an electrolyzer using the electrolytic cell of the present embodiment.

FIG. 6 shows a schematic cross-sectional view showing one example of the reverse current absorbing member according to the present embodiment.

FIG. 7 shows a schematic cross-sectional view showing an example of a second aspect of the electrolytic cell according to the present embodiment.

FIG. 8 shows a schematic view showing the positional relationship between a current collector and a reverse current absorbing member in Example 1.

FIG. 9 shows a schematic view showing the measurement position of the residual rate of ruthenium on the surfaces of cathodes in Example 1 to Example 13 and Comparative Examples 1 and 1-1.

FIG. 10 shows a schematic view showing the positional relationship between a current collector and a reverse current absorbing member in Example 2.

FIG. 11 shows a schematic view showing the positional relationship between a current collector and a reverse current absorbing member in Example 3.

FIG. 12 shows a schematic view showing the positional relationship between a current collector and a reverse current absorbing member in Example 4.

FIG. 13 shows a schematic view showing the positional relationship between a current collector and a reverse current absorbing member in Example 4-1.

FIG. 14 shows a schematic view showing the positional relationship between a current collector and a reverse current absorbing member in Example 5.

FIG. 15 shows a graph showing results of measuring an electrode potential in Comparative Example 2.

FIG. 16 shows a graph showing results of measuring the residual rate of ruthenium in Comparative Example 2.

FIG. 17 shows a graph showing results of measuring an electrode potential in Example 17.

FIG. 18 shows a graph showing results of measuring an electrode potential in Example 17.

FIG. 19 shows a graph showing results of measuring the residual rate of ruthenium in Example 17.

FIG. 20 shows a graph showing results of measuring an electrode potential in Example 17-1.

FIG. 21 shows a schematic view showing the measurement position of the residual rate of ruthenium on the cathode surface of an electrolytic cell used in the evaluation of the relationship between the residual rate of ruthenium and the elevation of a voltage.

DESCRIPTION OF EMBODIMENTS

Hereinafter, an embodiment for carrying out the present invention (hereinafter, referred to as the "present embodiment") will be described in detail with reference to the accompanying drawings, if necessary. The present embodiment mentioned later is an example for describing the present invention, and the present invention is not limited to the following contents. In addition, the accompanying drawings are intended only to show examples of the present embodiment, and the present embodiment is not intended to be construed as being limited thereto. The present invention can be appropriately modified and carried out within the scope of the invention. Meanwhile, unless otherwise specified, the positional relationships such as the right and the left and the top and the bottom in the drawings are based on the positional relationships shown in the drawings. The dimensions and proportions of the drawings are not limited to those illustrated.

The electrolytic cell of the present embodiment is an electrolytic cell comprising a cathode chamber, the cathode chamber comprising:

a cathode; and a reverse current absorbing member comprising a substrate and a reverse current absorbing body, the reverse current absorbing member being disposed to face the cathode, wherein the cathode and the reverse current absorbing body are electrically connected, and when the height at the bottom of the cathode chamber is defined as 0 and the height at the top of the cathode chamber is defined as h, the ratio of area S3 of the reverse current absorbing body present at position I corresponding to a height of h/2 or more and h or less to area $S_A$ of the cathode-facing surface of the substrate corresponding to the position I satisfies $0.20 \leq S3/S_A < 1.0$. The electrolytic cell of the present embodiment thus configured is not only conveniently achievable at a low cost but can suppress the degradation of the cathode by the reverse current generated at the time of stopping electrolysis, the damage of the ion exchange membrane and the elevation of a voltage.

The electrolyzer of the present embodiment comprises the electrolytic cell of the present embodiment. The electrolyzer of the present embodiment thus configured is not only conveniently achievable at a low cost but can suppress the degradation of the cathode by the reverse current generated at the time of stopping electrolysis, the damage of the ion exchange membrane and the elevation of a voltage.

In the electrolytic cell of the present embodiment, when the height at the bottom of the cathode chamber is defined as 0 and the height at the top of the cathode chamber is defined as h, the ratio of area S3 of the reverse current absorbing body present at position I corresponding to a height of h/2 or more and h or less to area $S_A$ of the cathode-facing surface of the substrate corresponding to the position I satisfies $0.20 \leq S3/S_A < 1.0$. In this context, the top and the bottom of the cathode chamber are determined as end portions in the inside of the cathode chamber when the direction of movement of an electrolyte solution supplied from the outside to the electrolytic cell (i.e., the direction from an electrolyte solution supply tube toward an electrolyte solution recovery tube) is defined as a height direction. In a typical electrolytic cell structure, the top and the bottom of a cathode chamber almost agree with the top and the bottom of a cathode, the top and the bottom of a current collector, and the top and the bottom of a support. However, the electrolytic cell of the present invention is not limited by such a structure, and the top and the bottom of each member may be different heights, respectively.

As shown in Examples and Comparative Examples mentioned later, the present inventors have measured the time course of a cathode potential while the reverse current flowed after stopping electrolysis, and consequently found out that in the electrolytic cell, the electric potential of the cathode corresponding to a height from ½h to h elevates more rapidly than the electric potential of the cathode corresponding to a height from 0 to less than ½h. These results indicate that the dissolution of a cathode catalyst by the reverse current does not uniformly occur within the surface of the electrode and rather starts from the upper portion of the electrode. In other words, for protecting the whole surface of the cathode catalyst from the dissolution, the area of the reverse current absorbing body present at position I corresponding to a height from ½h to h is important in the electrolytic cell.

By setting $S3/S_A$ to a value of 0.20 or more, the area of the reverse current absorbing body has a value sufficient for protecting the whole surface of the cathode. Thus, the dissolution of a cathode catalyst can be suppressed by 90% or more in a reverse current test mentioned later. More preferably, the value is 0.36 or more. In this case, the dissolution of a cathode catalyst tends to be able to be suppressed by almost 100%.

Meanwhile, the reverse current absorbing body may serve as resistance of an electrolyte solution to flow. When $S3/S_A$ is a value of 1.0 or more, the influence of the reverse current absorbing body as such resistance to flow tends to emerge. As a result, this tends to lead to the occurrence of membrane damage. A gas generated during electrolysis tends to accumulate in the upper portion of the electrolytic cell, as mentioned above. The position I in the electrolytic cell is gas-rich and thus tends to particularly reduce the supply of an electrolyte solution. Hence, by setting $S3/S_A$ to a value of less than 1.0, the supply of an electrolyte solution is maintained. Thus, the frequency of the occurrence of membrane damage can be reduced. More preferably, the value is 0.79 or less. In this case, the frequency of the occurrence of membrane damage can be drastically reduced.

A larger value described above in the order of a current collector, a support, and a partition wall in terms of the installation position of the reverse current absorbing body is more preferred in consideration of a distance from a cathode surface. In the case of, for example, installing the reverse current absorbing body on a partition wall, $S3/S_A$ is more preferably 0.5 or more.

In the present embodiment, when an electrolysis test described below is conducted using the cathode chamber, the ratio of amount M2 of a catalytic metal (catalytic element of the cathode) after the electrolysis test to amount M1 of the catalytic metal before the electrolysis test, M2/M1, is preferably 0.1 or more. Since the electrolysis test adopts very severe conditions, a voltage tends to elevate drastically along with increase in the amount of a cathode catalytic component dissolved. However, the electrolytic cell of the present embodiment can maintain the state of the cathode necessary for preventing the rapid elevation of a voltage. In other words, when the value of M2/M1 is 0.1 or more, the influence of the dissolution of the cathode catalytic component is small. Thus, the elevation of a voltage tends to be able to be effectively prevented. The value is more preferably 0.2 or more, still more preferably 0.3 or more, from the same viewpoint as described above. The electrolysis test can be conducted by a method described in Examples mentioned later. In the present embodiment, the value of M2/M1 can be adjusted to the range mentioned above, for example, by forming the reverse current absorbing body using a preferred material and method mentioned later, or adjusting the position of the reverse current absorbing body to a preferred position mentioned later.

[Electrolysis Test]

In an electrolyzer prepared by combining an anode chamber having an anode with a titanium substrate coated with an anode catalyst, a fluorine-containing ion exchange membrane, and the electrolytic cell, sodium chloride electrolysis is performed such that the NaCl concentration of an anode chamber exit is set to 3.5 N±0.2, the NaOH concentration of a cathode chamber exit is set to 32±1% by mass, and the temperature is set to 88±1° C. The reverse current described below is allowed to flow at each point in time of 2 hours, 22 hours and 42 hours after the start of the electrolysis, and further allowed to flow 110 hours after the start of the electrolysis to terminate the electrolysis. The current density up to 22 hours from the start of the sodium chloride electrolysis is set to 4 kA/m², and the current density at and after 22 hours from the start of the sodium chloride electrolysis is set to 6 kA/m².

(Conditions for Reverse Current)

The reverse current is allowed to flow at a current density of 50 A/m² for 15 minutes per run.

The position of the reverse current absorbing body is not particularly limited as long as the position satisfies the area ratio mentioned above, permits contact with an electrolyte solution, and is electrically connected to the cathode. The reverse current absorbing body can be disposed at various positions. The surface of the substrate that faces the cathode (i.e., the cathode-facing surface) has an exposed portion that is not coated with the reverse current absorbing body. Therefore, the electrolytic cell can be conveniently achievable at a low cost.

The electrolytic cell of the present embodiment thus configured can suppress the degradation of the cathode by the reverse current generated at the time of stopping electrolysis. In other words, the electrolytic cell of the present embodiment can be preferably applied to alkali salt electrolysis, water electrolysis, and fuel cells.

<First Aspect>

The electrolytic cell according to the first aspect of the present embodiment can be configured as follows as one typical example. In other words, this electrolytic cell can be configured such that the substrate has a current collector, a support supporting the current collector, a partition wall, and a baffle plate, and the reverse current absorbing member further has a metal elastic body, wherein the metal elastic body is disposed between the current collector and the cathode, the support is disposed between the current collector and the partition wall, and the partition wall, the support, the current collector, the metal elastic body and the cathode are electrically connected.

The electrolytic cell can also be configured such that the reverse current absorbing body comprises a metal plate or a metal porous plate, and a reverse current absorbing layer formed on at least a part of the surface of the metal plate or the metal porous plate, the substrate has a current collector, a support supporting the current collector, and a partition wall, and the reverse current absorbing member further has a metal elastic body, wherein the metal plate or the metal porous plate is disposed between the current collector and the cathode or between the current collector and the partition wall, and the metal plate or the metal porous plate, the partition wall, the support, the current collector, the metal elastic body and the cathode are electrically connected.

FIG. 1 shows one example of the electrolytic cell according to the first aspect described above in a schematic cross-sectional view. Electrolytic cell 1 comprises anode chamber 10, cathode chamber 20, partition wall 30 which separates between the anode chamber 10 and the cathode chamber 20, anode 11 installed in the anode chamber 10, cathode 21 installed in the cathode chamber 20. The electrolytic cell 1 further comprises reverse current absorbing body 18 in the cathode chamber 20. The reverse current absorbing body 18 can be configured to have metal porous plate 18a and reverse current absorbing layer 18b formed on the metal porous plate 18a, as illustrated in FIG. 6. The anode 11 and the cathode 21 belonging to one electrolytic cell 1 are electrically connected to each other.

The metal porous plate 18a is not particularly limited and is preferably:

Ni, a Ni alloy; or

Fe, Fe alloy or stainless material, which comprises a Ni- or Ni alloy-coated layer on its surface.

The cathode chamber 20 comprises cathode 21 installed in the cathode chamber 20, and reverse current absorbing body 18 installed in the cathode chamber 20. The reverse current absorbing body 18 has metal plate or metal porous plate 18a, and a reverse current absorbing layer 18b formed on the metal plate or metal porous plate 18a, as shown in FIG. 6. The cathode 21 and the reverse current absorbing layer 18b are electrically connected, i.e., the cathode 21 and the reverse current absorbing body 18 are electrically connected. The reverse current absorbing layer 18b may be laminated on a part or the whole of one surface of the metal plate or metal porous plate 18a, as shown in FIG. 6, or may cover two or more surfaces of the metal plate or metal porous plate 18a or may completely cover the whole surface of the metal plate or metal porous plate 18a. The cathode chamber 20 further has current collector 23, support 24 supporting the current collector, and metal elastic body 22. The metal elastic body 22 is installed between the current collector 23 and the cathode 21. The support 24 is installed between the current collector 23 and the partition wall 30. The current collector 23 is electrically connected to the cathode 21 via the metal elastic body 22. The partition wall 30 is electrically connected to the current collector 23 via the support 24. Thus, the partition wall 30, the support 24, the current collector 23, the metal elastic body 22 and the cathode 21 are electrically connected. The cathode 21 and the reverse current absorbing body may be directly connected, or may be indirectly connected via the current collector, the support, the metal elastic body or the partition wall, etc. The whole surface of the cathode 21 is preferably coated with a catalytic layer for reduction reaction. The form of electrical connection may be a form in which the partition wall 30 and the support 24, the support 24 and the current collector 23, and the current collector 23 and the metal elastic body 22 are directly attached to each other, respectively, and the cathode 21 is laminated on the metal elastic body 22. Examples of the method for attaching these respective constructional members directly to each other include welding.

In FIG. 1, the reverse current absorbing body 18 is formed on the current collector 23 as a substrate. In this example, the reverse current absorbing member comprises reverse current absorbing body 18 and current collector 23, and this reverse current absorbing member is disposed to face the cathode 21.

The phrase "disposed to face" means any state where the cathode-facing surface of the substrate and the cathode are disposed in the face-to-face relationship, and may be a state disposed with a predetermined space or may be a state disposed with no space. This phrase conceptually includes the case where an additional member is interposed between the surfaces of both the substrate and the cathode. Their flat surfaces do not have to be parallel to each other, and the substrate and the cathode may face each other with a slope.

The cathode-facing surface of the substrate can be interpreted in the same manner as in the term "face" mentioned above. In the exemplary aspect shown in FIG. 1 in which the partition wall 30 and the support 24, the support 24 and the current collector 23, and the current collector 23 and the metal elastic body 22 are directly attached to each other, respectively, and the cathode 21 is laminated on the metal elastic body 22, the "cathode-facing surface of the substrate" is a surface at the cathode 21 side of the current collector 23. Thus, in the present embodiment, the cathode-facing surface of the substrate is preferably a surface at the cathode side of the current collector.

In the electrolytic cell of the present embodiment, as shown in FIG. 2, area S3 of the reverse current absorbing body 18 present at position I corresponding to a height of h/2 or more and h or less, which is determined when the height at bottom 19C of the cathode chamber is defined as 0 and the height at top 19D of the cathode chamber is defined as h, is important in relation to area $S_A$ of the cathode-facing surface of the substrate. In the example shown in FIG. 2, bottom 19A of the anode chamber and the bottom 19C of the cathode chamber agree with each other at the height 0, and top 19B of the anode chamber and the top 19D of the cathode chamber agree with each other at the height h.

In the present specification, the area of the reverse current absorbing body means the area of the cathode-facing surface of the reverse current absorbing body. When there are a plurality of reverse current absorbing bodies 18, the total area thereof is regarded as S3. The shapes of the cathode and the reverse current absorbing body are not particularly limited. When the cathode and/or the reverse current absorbing body has an opening having a reticular shape or the like and when (i) the opening ratio is less than 90%, the opening portion is also included in the area with respect to S3 and $S_A$. On the other hand, when (ii) the opening ratio is 90% or more, S3 and $S_A$ are calculated using an area excluding the opening portion in order to sufficiently secure the function of the reverse current absorbing body. In this context, the opening ratio is a numeric value (%) obtained by dividing total area S' of the opening portion in the cathode-facing surface of the reverse current absorbing body by area S" of the cathode-facing surface of the reverse current absorbing body obtained by including the opening portion in the area (100×S'/S").

When the substrate is configured to have current collector 23, support 24 supporting the current collector 23, partition wall 30, and a baffle plate (not shown) as shown in FIG. 1, the cathode-facing surface of the substrate is a surface of the current collector 23 that faces the cathode 21.

Although FIG. 1 shows an example in which the reverse current absorbing body 18 is disposed only on the current collector 23, the reverse current absorbing body may be further disposed on the partition wall 30, the support 24, the metal elastic body 22, a baffle plate (not shown), or the like without limitations thereto. When a plurality of reverse current absorbing bodies 18 at the position I overlap each other in height (e.g., when two reverse current absorbing bodies are present at the same height, one of which is disposed on the partition wall and the other of which is disposed on the current collector), the area S3 is determined as an area viewed from an electrolytic surface. In other words, the overlapping portion mentioned above is excluded.

When one reverse current absorbing body 18 extends both the position I and the position II, only the area of a portion corresponding to the position I is included in the area S3.

In the electrolytic cell of the present embodiment, when the area of the reverse current absorbing body present at position II corresponding to a height from 0 or more and less than ½h is defined as S4, a relationship of S4<S3 is preferred.

A gas generated by electrolysis moves upward in the electrolytic cell. Hence, a portion closer to the top of the electrolytic cell is in a gas-richer state during electrolysis. In other words, generated bubbles generally tend to build up at the position I, though depending on the structure or operating conditions of the electrolytic cell. More specifically, hydrogen gas generated in the cathode runs between the cathode and the current collector and moves upward while partially escaping to the cathode partition wall side from the current collector. Hence, the upper portion of the electrolytic cell is prone to the buildup of an electrolyte solution as compared with the lower portion thereof. Usually, an ion exchange membrane is designed so as to exert high performance and high durability in a predetermined caustic concentration range. The upper portion of the electrolytic cell where an electrolyte solution rich in produced gas easily builds up has an environment more likely to reduce performance or durability.

In the present embodiment, the area of the reverse current absorbing body present at the position I is larger than the area of the reverse current absorbing body present at the position II. This tends to be able to protect the whole cathode while reducing a cost. For example, when electrolytic cells having the same value of $S4/S_A$ are compared to each other, the whole cathode tends to be able to be protected by installing the reverse current absorbing body on the current collector such that the area is larger at the position I than that at the position II (i.e., S4<S3), because cathode damage occurs more easily in the upper portion of the electrolytic cell.

FIG. 3 shows a cross-sectional view of two electrolytic cells 1 adjacent in electrolyzer 4 of the present embodiment. FIG. 4 shows the electrolyzer 4. FIG. 5 shows the process of assembling the electrolyzer 4. As shown in FIG. 3, electrolytic cell 1, ion exchange membrane 2, and electrolytic cell 1 are arranged in series in this order. The ion exchange membrane 2 is disposed between the anode chamber of one of the two electrolytic cells 1 adjacent in the electrolyzer, and the cathode chamber of the other electrolytic cell 1. In other words, the ion exchange membrane 2 separates between the anode chamber 10 of the electrolytic cell 1 and the cathode chamber 20 of the electrolytic cell 1 adjacent thereto. As shown in FIG. 4, the electrolyzer 4 is constituted by a plurality of electrolytic cells 1 connected in series via ion exchange membranes 2. In other words, the electrolyzer 4 is a bipolar type electrolyzer comprising a plurality of electrolytic cells 1 disposed in series, and ion exchange membranes 2 disposed between the adjacent electrolytic cells 1. As shown in FIG. 5, the electrolyzer 4 is assembled by disposing a plurality of electrolytic cells 1 in series via the ion exchange membranes 2 and connecting them using a press machine 5.

The electrolyzer 4 has anode terminal 7 and cathode terminal 6 connected to a power supply. The anode 11 of the electrolytic cell 1 positioned at the end among a plurality of electrolytic cells 1 connected in series in the electrolyzer 4 is electrically connected to the anode terminal 7. The cathode 21 of the electrolytic cell positioned at the end opposite to the anode terminal 7 among a plurality of electrolytic cells 1 connected in series in the electrolyzer 4 is electrically connected to the cathode terminal 6. The current at the time of electrolysis flows from the anode terminal 7 side toward the cathode terminal 6 through the anode and cathode of each electrolytic cell 1. An electrolytic cell having only an anode chamber (anode terminal cell) and an electrolytic cell having only a cathode chamber (cathode terminal cell) may be disposed at both ends of the connected electrolytic cells 1. In this case, the anode terminal 7 is connected to the anode terminal cell disposed at one end thereof, and the cathode terminal 6 is connected to the cathode terminal cell disposed at the other end thereof.

In the case of performing the electrolysis of salt water, the salt water is supplied to each anode chamber 10, and pure water or an aqueous solution of sodium hydroxide having a low concentration is supplied to the cathode chamber 20. Each liquid is supplied from an electrolyte solution supply tube (omitted in the drawing) to each electrolytic cell 1 through an electrolyte solution supply hose (omitted in the drawing). In addition, the electrolyte solution and a product of the electrolysis are recovered by an electrolyte solution tube (omitted in the drawing). In the electrolysis, sodium ions in the salt water move from the anode chamber 10 of one electrolytic cell 1 to the cathode chamber 20 of the adjacent electrolytic cell 1 through the ion exchange membrane 2. Hence, the current during the electrolysis flows along the direction in which the electrolytic cells 1 are connected in series. In other words, the current flows from the anode chamber 10 toward the cathode chamber 20 via the ion exchange membrane 2. Along with the electrolysis of salt water, chlorine gas is generated at the anode 11 side, and sodium hydroxide (solute) and hydrogen gas are generated in the cathode 21 side.

The reverse current is generated by a voltage (electric potential difference) between the electrolytic cell 1 and the grounded electrolyte solution supply tube or electrolyte solution recovery tube at the time of stopping the electrolysis. The reverse current flows to the electrolyte solution supply tube or the electrolyte solution recovery tube via the electrolyte solution supply hose. The reverse current flows in a direction opposite to the direction of the current at the time of the electrolysis.

This reverse current is generated due to the state where a battery having chlorine as reactive species is formed at the time of stopping the electrolysis. Chlorine generated at the anode chamber 10 side is dissolved in the electrolyte solution (brine or the like) in the anode chamber 10 at the time of electrolysis. Then, a voltage is generated between the electrolytic cell 1 and the grounded electrolyte solution supply tube or electrolyte solution recovery tube at the time of stopping the electrolysis and thus the reverse current flows, because the equilibrium potential of chlorine dissolved in this anode chamber 10 is high.

Hydrogen and chlorine are generated in the cathode 21 and the anode 11, respectively, at the time of electrolysis. The amount of chlorine dissolved in the anode chamber 10 is incomparably greater compared to the amount of hydrogen dissolved in the cathode chamber 20. For this reason, the reverse current (oxidation current) is not completely consumed by only the reverse reaction of the hydrogen generation reaction in the cathode 21 and thus the cathode 21 itself consumes the reverse current (oxidation current), for example, if there is no reverse current absorbing layer 18b. Consequently, the degradation of the cathode 21 (oxidation of the cathode 21, and dissolution or oxidation of the catalytic layer) by the reverse current occurs when the electrolysis is stopped in the state where a large amount of dissolved chlorine is contained in the anode chamber 10. For example, in the case of using a catalyst material dissolvable by the reverse current, such as Ru or Sn, as a catalytic layer of the cathode, the catalytic layer of the cathode is dissolved by the reverse current generated at the time of stopping the electrolysis and thus the catalyst amount of the cathode 21 decreases, as a result, the lifetime of the cathode 21 is significantly shortened or the elevation of a voltage occurs.

On the other hand, in the case of using a catalyst material that is not dissolvable by the reverse current, such as Ni or Pt, as a catalytic layer of the cathode, the oxidation of the catalytic component by the reverse current generated at the time of stopping the electrolysis and an oxygen generation reaction on the cathode 21 side occur. In addition, a mixed gas of hydrogen and oxygen is generated in the cathode chamber 20 when the reverse current is great. Moreover, the catalytic layer of the cathode is easily deteriorated by the oxidation due to electrolysis stopping and the reduction due to re-energization, and thus the lifetime of the cathode 21 is shortened.

<Mechanism>

The mechanism under which the degradation of the cathode is suppressed by the consumption of the reverse current in the reverse current absorbing body 18 is described in, for example, Japanese Patent No. 5670600.

Various oxidation reactions of substances having an oxidation-reduction potential less noble than the oxygen generation potential of the cathode preferentially proceed on the cathode during the period of time from when the electrolysis is stopped to when the electric potential of the cathode reaches the oxygen generation potential. As a matter of course, the oxidation reaction of the component contained in the catalytic layer (coating) of the cathode also proceeds. The oxidation of the component contained in the coating of the cathode adversely affects the coating of the cathode in such a way to reduce the performance and durability of the cathode.

However, the electrolytic cell of the present embodiment can be configured such that a reverse current absorbing body having an oxidation-reduction potential less noble than that of the component contained in the catalytic layer of the cathode is electrically connected to the cathode. The reverse current generated at the time of stopping the electrolysis is not consumed in the cathode but consumed in the reverse current absorbing body electrically connected to the cathode. In other words, the reverse current absorbing body absorbs the reverse current so that the oxidation reaction of the reverse current absorbing layer corresponding to the electric quantity of the reverse current proceeds. As a result, the oxidation and degradation of the catalytic layer of the cathode 21 by the reverse current are suppressed. In addition, use of the reverse current absorbing body can also prevent the reduction in performance and durability of the catalytic layer of the cathode by the impurities (particularly, Fe ions) contained in the cathode liquid. This is presumably because the reverse current absorbing body has a large specific surface area and the electrolytic reduction reaction of Fe ions in the reverse current absorbing body more easily occurs than the reaction in the catalytic layer of the cathode.

<Mechanism in the Case of Using Ru Cathode>

The mechanism in the case of using a Ni substrate having a surface coated with a catalytic layer containing Ru in the cathode is described in, for example, Japanese Patent No. 5670600.

The oxidation reaction of Ni of the reverse current absorbing body proceeds when a reverse current absorbing member equipped with a reverse current absorbing body containing Ni is introduced into the cathode chamber and electrically connected with the cathode, and the electric potential of the cathode (catalytic layer) does not elevate to or higher than the electric potential of the reverse current absorbing body when the electric quantity consumed by this reaction is greater than the electric quantity of the reverse current. This is because the cathode and the reverse current absorbing body are electrically connected and thus the electric potentials thereof are constantly the same. As a result, the oxidative dissolution reaction of Ru of the catalytic layer can be suppressed because the oxidation reaction of Ni of the reverse current absorbing body proceeds preferentially to the dissolution reaction of Ru.

(Catalytic Layer)

Although the case where the catalytic layer of the cathode is constituted by Ru has been described above, an element other than Ru may be used in the catalytic layer. Examples of the element for the catalytic layer include C, Si, P, S, Al, Ti, V, Cr, Mn, Fe, Co, Ni, Cu, Zn, Y, Zr, Nb, Mo, Rh, Pd, Ag, Cd, In, Sn, Ta, W, Re, Os, Ir, Pt, Au, Hg, Pb, Bi, La, Ce, Pr, Nd, Pm, Sm, Eu, Gd, Tb, Dy, Ho, Er, Tm, Yb, and Lu. The same effect as in the case of Ru can be obtained by selecting a material having an oxidation-reduction potential less noble than the oxidation-reduction potential of these elements as the material of the reverse current absorbing body. In the case of using the element other than Ru in the catalytic layer, an oxidation reaction also proceeds when the cathode potential elevates, and thus reduction in performance, etc. occurs. In addition, reactions (1), (2), (4), and (5) among reactions (1) to (5) described below proceed.

$$H + OH^- \rightarrow H_2O + e^- \qquad \text{Reaction (1)}$$

$$Ni + 2OH^- \rightarrow Ni(OH)_2 + 2e^- \qquad \text{Reaction (2)}$$

$$RuO_xH_y + aOH^- \rightarrow RuO_4^{2-} + bH_2O + ce^- \qquad \text{Reaction (3)}$$

$$Ni(OH)_2 + OH^- \rightarrow NiOOH + H_2O + e^- \qquad \text{Reaction (4)}$$

$$4OH^- \rightarrow O_2 + 2H_2O + 4e^- \qquad \text{Reaction (5)}$$

The trivalent to tetravalent nickel compound generated particularly in the reaction (4) among these reactions has a needle-like, hexagonal, or hexagonal pillar stage structure and furthermore, is generated at the interface of the catalytic layer and the cathode substrate. As a result, the peeling of the catalytic layer from the cathode occurs, leading to the reduction in performance and durability of the catalytic layer. In this context, use of a reverse current absorbing body having a reverse current absorbing layer constituted by Ni can maintain the cathode potential at the electric potential less noble than the oxidation-reduction potential of the element contained in the catalytic layer of the cathode or the electric potential of the reaction (4) by the same principle as described above, and can therefore suppress the oxidation of the catalytic layer and the generation of the trivalent to tetravalent nickel compound in the cathode and maintain the performance and durability of the catalytic layer.

(Cathode)

The cathode 21 is provided in the frame of the cathode chamber 20. The cathode 21 preferably has a nickel substrate and a catalytic layer coating the nickel substrate. Examples of the component of the catalytic layer on the nickel substrate include metals such as C, Si, P, S, Al, Ti, V, Cr, Mn, Fe, Co, Ni, Cu, Zn, Y, Zr, Nb, Mo, Ru, Rh, Pd, Ag, Cd, In, Sn, Ta, W, Re, Os, Ir, Pt, Au, Hg, Pb, Bi, La, Ce, Pr, Nd, Pm, Sm, Eu, Gd, Tb, Dy, Ho, Er, Tm, Yb, and Lu, and oxides or hydroxides of the metals. Two or more types of elements may be combined.

Examples of the element include ruthenium alone, ruthenium+nickel, ruthenium+cerium, ruthenium+lanthanum, ruthenium+lanthanum+platinum, ruthenium+lanthanum+palladium, ruthenium+praseodymium, ruthenium+praseodymium+platinum, ruthenium+praseodymium+platinum+palladium, ruthenium+neodymium, ruthenium+neodymium+platinum, ruthenium+neodymium+manganese, ruthenium+neodymium+iron, ruthenium+neodymium+cobalt, ruthenium+neodymium+zinc, ruthenium+neodymium+gallium, ruthenium+neodymium+sulfur, ruthenium+neodymium+lead, ruthenium+neodymium+nickel, ruthenium+neodymium+copper, ruthenium+samarium, ruthenium+samarium+manganese, ruthenium+samarium+iron, ruthenium+samarium+cobalt, ruthenium+samarium+zinc, ruthenium+samarium+gallium, ruthenium+samarium+sulfur, ruthenium+samarium+lead, ruthenium+samarium+nickel, platinum+cerium, platinum+palladium+cerium, platinum+palladium+lanthanum+cerium, platinum+iridium, platinum+palladium, platinum+iridium+palladium, platinum+nickel+palladium, alloy of platinum and nickel, alloy of platinum and cobalt, alloy of platinum and iron, and alloy of platinum, nickel and palladium.

A catalyst containing no platinum group metal, platinum group metal oxide, platinum group metal hydroxide, or alloy containing a platinum group metal is preferably composed mainly of a nickel element.

It is preferred to contain at least one type of nickel metal, oxide, or hydroxide.

A transition metal may be added as a second component. The second component to be added preferably contain at least one type of element selected from titanium, tin, molybdenum, cobalt, manganese, iron, sulfur, zinc, copper, and carbon.

Preferred examples of the combination include nickel+tin, nickel+titanium, nickel+molybdenum, and nickel+cobalt.

The catalytic layer described above may be used as a first layer, and a second layer can be formed on the first layer. Preferred examples of the combination of elements contained in the second layer include the combinations listed about the first layer. The combination of the first layer and the second layer may be a combination having the same composition and different compositional ratios or may be a combination differing in composition.

If necessary, an intermediate layer can be provided between the first layer and the nickel substrate. The installation of the intermediate layer can improve the durability of the cathode.

Examples of the method for forming the catalytic layer include plating, alloy plating, dispersion and composite plating, CVD, PVD, thermal decomposition, and thermal spraying. These methods may be combined. In addition, the cathode 21 may be subjected to a reduction treatment, if necessary. Meanwhile, a nickel alloy may be used as the substrate of the cathode 21 instead of the nickel substrate.

In the present embodiment, the cathode preferably has: a cathode substrate made of Ni or a Ni alloy, or Fe plated with Ni or a Ni alloy; and a catalytic layer containing the catalytic metal, formed on the cathode substrate.

(Reverse Current Absorbing Body)

The reverse current absorbing body (also referred to as the "reverse current absorbing layer 18b" particularly when a metal plate or a metal porous plate is contained; the same holds true for the description below) preferably contains an element having a less noble oxidation-reduction potential (low oxidation-reduction potential) compared to the cathode. In other words, the oxidation-reduction potential of the oxidation reaction of the reverse current absorbing body is preferably less noble compared to the oxidation-reduction potential of the oxidation reaction of the catalytic layer coating the surface of the cathode 21.

Examples of the material of the reverse current absorbing body include an inorganic substance such as a metal material or an oxide material having a high specific surface area, and a carbon material having a high specific surface area.

The material having a high specific surface area is preferably a material having an oxidation-reduction potential less noble than the oxidation-reduction potential of the component contained in the catalytic layer (coating) of the cathode 21. Examples of such a material include C, Cr, Ni, Ti, Fe, Co, Cu, Al, Zr, Ru, Rh, Pd, Ag, W, Re, Os, Ir, Pt, Au, Bi, Cd, Hg, Mn, Mo, Sn, Zn, La, Ce, Pr, Nd, Pm, Sm, Eu, Gd, Tb, Dy, Ho, Er, Tm, Yb, and Lu. For example, when the catalytic layer of the cathode 21 contains Ru, for example, Ni, Mn, Cr, Fe, Co, Re, La, Ce, Pr, Nd, Pm, Sm, Eu, Gd, Tb, Dy, Ho, Er, Tm, Yb, or Lu which has an oxidation-reduction potential less noble than that of Ru can be used as the material constituting the reverse current absorbing body. The reverse current is absorbed by the reaction forming a hydroxide or an oxide from the above element contained in the reverse current absorbing body so that the oxidation of the cathode is suppressed. Use of a mixture, an alloy, or a composite oxide of the elements described above as the reverse current absorbing body can also produce the effect of absorbing the reverse current. When the catalytic layer of the cathode 21 contains Pt, for example, Ni, Mn, Cr, Fe, Co, Re, La, Ce, Pr, Nd, Pm, Sm, Eu, Gd, Tb, Dy, Ho, Er, Tm, Yb, or Lu which has an oxidation-reduction potential less noble than that of Pt can be used as the metal material constituting the reverse current absorbing body.

Examples of the carbon material having a high specific surface area can include activated carbon, activated carbon fibers, carbon black, graphite, carbon fibers, carbon nanotubes, and mesoporous carbon. The carbon material having a high specific surface area can function as a capacitor that stores the electric quantity of the reverse current.

An organic substance such as a conductive polymer may be used as the material of the reverse current absorbing body. Examples of the conductive polymer include polyaniline, 1,5-diaminoanthraquinone, a cyclic indole trimer, and poly(3-methylthiophene).

The materials of the reverse current absorbing body described above can also be used in combination.

Among the materials of the reverse current absorbing body described above, the metal material having a high specific surface area and an oxide material are preferred, and nickel having a high specific surface area is more preferred, from the viewpoint of durability over a long period.

Preferably, the reverse current absorbing body is a porous body containing a nickel element, and the full width at half maximum of the diffraction line peak of Ni metal at the diffraction angle $2\theta=44.5°$ in a pattern obtained in the powder X-ray diffraction of the porous body is 0.6° or less. The reverse current absorbing layer 18b is more preferably a porous layer containing Ni or NiO.

When the full width at half maximum is 0.6° or less, the crystallinity of the reverse current absorbing body increases. Thus, the physical durability and the chemical durability tend to increase. High physical durability means that the reverse current absorbing body is strengthened as nickel metal is present as a backbone and thus the reverse current absorbing body hardly peels off from the current collector although physical force (e.g., pressure due to the metal elastic body) is applied thereto. In addition, high chemical durability means that the inside of the nickel metal present in the reverse current absorbing body as a backbone is not subject to an oxidation or a reduction. The nickel metal can be stably present while maintaining the backbone structure during the electrolysis and the reverse electrolysis due to the high chemical durability because the reverse electrochemical reaction is a surface reaction. The full width at half maximum described above is more preferably 0.5° or less, particularly preferably 0.45° or less. Although the lower limit of the full width at half maximum is not particularly limited, the full width at half maximum is, for example, 0.01° or more. The full width at half maximum is preferably 0.1 or more, more preferably 0.2° or more.

The X-ray diffraction can be performed by a method described in Examples mentioned later. In the present embodiment, the full width at half maximum can be adjusted, for example, by controlling the heat quantity at the time of coating production, and specifically, can be decreased by increasing the heat quantity and can be increased by decreasing the heat quantity. Such a method or the like can adjust the value of the full width at half maximum to within the range mentioned above.

The reverse current absorbing body can be constituted using an element that exhibits an oxidation-reduction potential less noble than the oxidation-reduction potential of the catalytic element of the cathode. The element that exhibits an oxidation-reduction potential less noble than that of the cathode catalytic element is oxidized in advance of the cathode catalytic element upon generation of the reverse current and therefore tends to effectively function.

The reverse current absorbing body may have the elements mentioned above other than Ni. For example, C, Cr, Al, Zr, Ru, Rh, Ag, Re, Os, Ir, Pt, Au, Bi, Cd, Co, Cu, Fe, Hg, Mn, Mo, Pd, Sn, Ti, W, Zn, La, Ce, Pr, Nd, Pm, Sm, Eu, Gd, Tb, Dy, Ho, Er, Tm, Yb, and Lu can also absorb the reverse current through a reaction to form a hydroxide or an oxide thereof. Therefore, the reverse current absorbing body may contain these elements or a mixture, an alloy, or a composite oxide thereof in addition to Ni or NiO. In the case of containing an element other than Ni, the proportion of Ni to the total elements contained in the reverse current absorbing body is preferably 10% by mole or more and 100% by mole or less. The proportion is more preferably 30% by mole or more and 100% by mole or less, still more preferably 50% by mole or more and 100% by mole or less.

The reverse current absorbing body preferably contains at least one element selected from the group consisting of titanium, vanadium, chromium, manganese, iron, nickel, cobalt, copper, zinc, palladium, ruthenium and platinum, in consideration of an environment of usage, a cost, etc. The form of the compound may be a mixture of oxides, a composite oxide, or an alloy.

The reverse current absorbing body is preferably formed by thermally spraying Ni or NiO on at least a part of the surface of the current collector, or thermally decomposing a solution containing Ni. The reverse current absorbing body formed by thermally spraying NiO or formed by thermal decomposition is preferably formed by performing a reduction treatment to the NiO. This can increase the quantity of the reverse current absorbed by the reverse current absorbing body from the initial stage of the electrolysis. Moreover, the reverse current absorbing body also has greater durability.

In the reverse current absorbing body, the pore volume of the pores having a pore size of 10 nm or greater is preferably 80% or more, more preferably 85% or more, still more preferably 90% or more, of the total pore volume in the pore size distribution curve measured by the nitrogen gas adsorption method. This can effectively suppress heat generation when the electrolyzer is stopped and the reverse current absorbing body is exposed to the air. Thus, the safety tends to be more improved.

<Specific Surface Area, Pore Size Distribution Curve, and Pore Volume>

The specific surface area, pore size distribution curve, and pore volume of the reverse current absorbing body can be obtained as follows. The sample for measurement is introduced into a dedicated cell and subjected to heat evacuation to perform the pretreatment, thereby removing the adsorbate on the pore surface. Thereafter, the adsorption and desorption isotherm of nitrogen adsorption to the sample for measurement is measured at −196° C. The specific surface area of the sample for measurement can be determined by analyzing the adsorption and desorption isotherm thus obtained by the BET method. In addition, the pore size distribution curve and the pore volume of the sample for measurement can be determined by analyzing the adsorption and desorption isotherm thus obtained by the BJH method.

The sum of the effective surface areas of all of the reverse current absorbing bodies carried by one electrolytic cell is preferably from 10 to 100,000 m$^2$. The effective surface area means the surface area including the pore of the reverse current absorbing body. As mentioned above, more electrochemical reactions proceed in the reverse current absorbing body having a larger specific surface area, and thus more electric quantity of the reverse current can be absorbed. For that reason, the reverse current absorbing body can sufficiently absorb the reverse current when the sum of the effective surface areas of all of the reverse current absorbing bodies carried by one electrolytic cell is in the range described above.

The sum of the effective surface areas (total effective surface area) of all of the reverse current absorbing bodies carried by one electrolytic cell is calculated by multiplying the specific surface area (m$^2$/g) of the reverse current absorbing body measured by the nitrogen adsorption method by the amount (g) of all of the reverse current absorbing bodies carried by one electrolytic cell.

<Oxidation-Reduction Ability and Charge and Discharge Ability>

The upper limits of the oxidation-reduction ability and charge and discharge ability of reverse current absorbing body are not particularly limited. The oxidation-reduction ability and charge and discharge ability of reverse current absorbing body are represented by the value obtained by dividing the sum of the electric quantities absorbable by all of the reverse current absorbing bodies installed in one electrolytic cell by the electrolytic area of the electrolytic cell. The electrolytic area of the electrolytic cell is equal to the sum of the areas of all of the cathodes or all of the anodes in the electrolytic cell. The reverse current absorbing body preferably has the oxidation-reduction ability exhibiting 1,000 C or more and 2,000,000 C or less of electric quantity per m$^2$ of electrolytic area. In other words, the electric quantity absorbed by all of the reverse current absorbing bodies carried by one electrolytic cell is preferably 1,000 to 2,000,000 [Coulomb/m$^2$]. As mentioned above, the amount of reverse current absorbing body counterbalancing to the electric quantity of the reverse current may be introduced in order to allow the reaction consuming the electric quantity enough to absorb the electric quantity of the reverse current to proceed in the reverse current absorbing body. The reverse current absorbing body can sufficiently absorb the reverse current when the electric quantity absorbable by all of the reverse current absorbing bodies carried by one electrolytic cell is in the range described above. This can more suppress the degradation of the cathode. Alternatively, the reverse current absorbing body has the charge and discharge ability exhibiting preferably 2,000,000 C or less of electric quantity, more preferably 1,500,000 C or less of electric quantity, still more preferably 1,000,000 C or less of electric quantity, per m$^2$ of electrolytic area.

The fact that the reverse current absorbing body has the oxidation-reduction ability exhibiting 1,000 C or more of electric quantity per m$^2$ of the electrolytic area means that an oxidation reaction or a reduction reaction can be caused on the surface of the reverse current absorbing body when 1,000 C or more of electric quantity per m$^2$ of electrolytic area flows therein.

The fact that the reverse current absorbing body has the charge and discharge ability exhibiting 1,000 C or more of electric quantity per m$^2$ of the electrolytic area means that charge can be performed on the surface of the reverse current absorbing body when 1,000 C or more of electric quantity per m$^2$ of electrolytic area flows therein.

The sum of electric quantities absorbed by all of the reverse current absorbing bodies carried by one electrolytic cell can be measured by, for example, the following method. The electric potential of the reverse current absorbing body in the aqueous solution of sodium hydroxide is set to the same electric potential (−1.2 V vs. Ag|AgCl) as that during the salt electrolysis. Thereafter, the electric potential of the reverse current absorbing body is monitored while applying a reverse current by a constant current, and the time until the electric potential reaches a certain electric potential is measured. For example, the time until the electric potential of the reverse current absorbing body reaches −0.1 V (vs. Ag|AgCl) which is the electric potential at which the oxidative dissolution of Ru begins is measured. The electric quantity of the reverse current absorbable by all of the reverse current absorbing bodies until the oxidative dissolution of Ru is calculated by the product of this time and the current density of the reverse current.

The reverse current absorbing layer 18b may be a thin film shape, a powder shape, a plate-like shape, or a reticular shape. The reverse current absorbing layer 18b may be attached to the metal porous plate 18a or may coat the substrate.

The specific surface area of the reverse current absorbing body is preferably 0.01 to 100 m$^2$/g, more preferably 0.1 to 30 m$^2$/g, still more preferably 0.2 to 10 m$^2$/g, from the viewpoint of more increasing the quantity of the reverse current absorbed. The specific surface area can be measured by the nitrogen adsorption method (BET method). When the specific surface area is 0.01 m$^2$/g or more, the effect of the present invention can be easily obtained. When the specific surface area is 100 m$^2$/g or less, heat generation that may occur when the reverse current absorbing body is exposed to the air after the electrolyzer is stopped can be effectively suppressed. Thus, the safety tends to be more improved.

In the present embodiment, the surface area can be adjusted, for example, by controlling the heat quantity at the time of coating formation, and specifically, can be decreased by increasing the heat quantity and can be increased by decreasing the heat quantity. Such a method or the like can adjust the value of the specific surface area of the reverse current absorbing body to within the range mentioned above.

The amount of reverse current absorbing body counterbalancing to the electric quantity of the reverse current may be introduced in order to allow the oxidation reaction of the reverse current absorbing body consuming the electric quantity enough to absorb the electric quantity of the reverse current to proceed. For allowing more electrochemical reactions to proceed in the reverse current absorbing body, it is desirable that the reverse current absorbing body should have more surface areas, because the electrochemical reaction is a surface reaction. For this reason, the reverse current absorbing body having a larger specific surface area allows more electrochemical reactions to proceed and can thus absorb more electric quantity of reverse current when two reverse current absorbing bodies having the same mass are compared to each other. In addition, a reverse current absorbing body having a greater mass has a greater total surface area and thus can absorb more electric quantity when two reverse current absorbing bodies having the same specific surface area are compared to each other.

In order to form the reverse current absorbing layer 18b into a desired porous layer, for example, a method can be adopted in which a raw material powder such as metallic nickel powder or nickel oxide powder is granulated into a particle of from 10 to 100 μm, and then the reverse current absorbing layer 18b is formed from the raw material powder by the thermal spraying method. The formation of the reverse current absorbing body by the thermal spraying method tends to moderately improve the adhesion of the reverse current absorbing layer 18b to the metal porous plate 18a or the adhesion of the nickel particles in the reverse current absorbing layer 18b. In the case of forming the reverse current absorbing layer 18b on the current collector 23, the adhesion of the reverse current absorbing layer 18b to the current collector 23 is also moderately improved. This can also improve durability.

Alternatively, the reverse current absorbing body may be formed by the thermal decomposition method of applying a solution of a nickel compound dissolved therein to the metal porous plate 18a, followed by drying and calcinating. The formation of the reverse current absorbing body by the thermal decomposition method tends to moderately improve the adhesion of the reverse current absorbing layer 18b to the metal porous plate 18a or the adhesion of the nickel particles in the reverse current absorbing layer 18b. In the case of forming the reverse current absorbing layer 18b on the current collector 23, the adhesion of the reverse current absorbing layer 18b to the current collector 23 is also moderately improved. This can also improve durability.

In order to obtain 0.6° or less of the full width at half maximum of the diffraction line peak of Ni metal at a diffraction angle 2θ=44.50 in a powder X-ray diffraction pattern of the reverse current absorbing layer 18b, for example, a method can be adopted in which the reverse current absorbing layer 18b is formed by the thermal spraying method or the thermal decomposition method.

In the thermal spraying method, the raw material powder such as metallic nickel powder or nickel oxide powder in a semi-molten state may be sprayed onto the substrate in the high temperature plasma. The raw material powder is preferably a powder granulated into a particle of from 10 to 100 μm. This tends to improve the adhesion between the substrate and the reverse current absorbing body. In addition, the raw material powder in a semi-molten state sprayed onto the substrate is cooled at the same time as being attached thereto and solidified and tends to form a particle having moderately high crystallinity. The full width at half maximum of the diffraction line peak of Ni metal at a diffraction angle 2θ=44.5° in a powder X-ray diffraction pattern of the reverse current absorbing body can be 0.6° or less by increasing the crystallinity of nickel metal in the reverse current absorbing body in this manner.

In the thermal decomposition method, a solution of a nickel complex such as nickel nitrate, nickel chloride, nickel sulfate, nickel hydroxide, or hexaamminenickel dissolved in water, alcohol, or an organic solvent is preferably applied to the substrate, followed by drying and calcinating. The calcination temperature is preferably in a range from 200° C. to 600° C.

In order to produce a reverse current absorbing body whose pore volume of the pores having a pore size of 10 nm or greater is 80% or more of the total pore volume, a raw material powder such as metallic nickel powder or nickel oxide powder is granulated into a particle of from 10 to 100 μm, and then the reverse current absorbing body may be formed from the raw material powder by the thermal spraying method. Alternatively, the reverse current absorbing body may be formed by the thermal decomposition method of applying a solution of a nickel compound dissolved therein to the metal porous plate 18a, followed by drying and calcinating.

(Positional Relationship Between Reverse Current Absorbing Body and Substrate and Metal Elastic Body)

The reverse current absorbing body 18 is a body different from the substrate such as the current collector, the baffle plate, the partition wall and the support, or the metal elastic body. In other words, the reverse current absorbing body can be easily attached to the existing cathode chamber of the electrolyzer later. In other words, the independent reverse current absorbing body can impart reverse current absorption capacity to the existing cathode chamber of the electrolyzer. In the present specification, the metal elastic body which may be included as a part of the reverse current absorbing member is a body different from the substrate. The number of the reverse current absorbing body, the number of the metal elastic body or the number of the substrate may be one or may be more than one. In addition, the shape of the substrate or the metal elastic body in the reverse current absorbing member may be a cube, a cuboid, a plate-like shape, a rod-like shape, a reticular shape, a disk-like shape or a spherical shape. At least a part of the substrate in the reverse current absorbing member may be the current collector, the baffle plate, the partition wall or the support. In other words, at least a part of the reverse current absorbing body may be disposed between the cathode and the metal elastic body, may be disposed between the metal elastic body and the current collector, and may be installed between the current collector and the partition wall.

In addition, the reverse current absorbing body may be installed, for example, in the inside of the metal elastic body, between the current collector and the baffle plate, between the baffle plate and the partition wall, or on the partition wall as long as the reverse current absorbing body comes into contact with an electrolyte solution. When the reverse current absorbing body resides between the cathode and the metal elastic body, the reverse current absorbing body may be electrically connected directly to the cathode. When the reverse current absorbing body resides between the metal elastic body and the current collector, the reverse current absorbing body is electrically connected to the cathode via the metal elastic body. When the reverse current absorbing body resides between the current collector and the partition wall, the reverse current absorbing body is electrically connected to the cathode via the current collector and the metal elastic body. Alternatively, the reverse current absorbing body is electrically connected to the cathode via the support, the current collector and the metal elastic body.

The metal elastic body is disposed on at least one surface of the substrate in the reverse current absorbing member, and the reverse current absorbing body may be formed on the surface of this metal elastic body. When the reverse current absorbing body is formed on the surface of the metal elastic body and the metal elastic body is electrically connected to the cathode, the reverse current absorbing body can absorb the reverse current. When the reverse current absorbing body functions as a metal elastic body, it is possible to easily install the reverse current absorbing body by merely placing the reverse current absorbing body on the current collector. In other words, the replacement of the reverse current absorbing body can be easily performed. Also, the reverse current absorbing body has a higher cathode protective effect by direct contact with the cathode.

At least a part of the substrate in the reverse current absorbing member is the partition wall, and the reverse current absorbing body may be formed on the surface of the partition wall. When the partition wall is electrically connected to the cathode through the support, the current collector, and the metal elastic body, the reverse current absorbing body formed on the partition wall can absorb the reverse current. It is also possible to reduce the manufacturing cost of the electrolytic cell owing to the partition wall serving as the substrate in the reverse current absorbing member.

At least a part of the substrate of the reverse current absorbing body is the support, and the reverse current absorbing body may be formed on the surface of the support. When the support is electrically connected to the cathode through the current collector and the metal elastic body, the reverse current absorbing body formed on the support can absorb the reverse current. It is also possible to reduce the manufacturing cost of the electrolytic cell owing to the support serving as the substrate in the reverse current absorbing member.

At least a part of the substrate of the reverse current absorbing body is the current collector, and the reverse current absorbing body may be formed on the surface of the current collector. When the current collector is electrically connected to the cathode through the metal elastic body, the reverse current absorbing body formed on the current collector can absorb the reverse current. It is also possible to reduce the manufacturing cost of the electrolytic cell owing to the current collector serving as the substrate in the reverse current absorbing member.

At least a part of the substrate of the reverse current absorbing body is the baffle plate, and the reverse current absorbing body may be formed on the surface of the baffle plate. When the baffle plate is electrically connected to the cathode through the support, the current collector, and the metal elastic body, the reverse current absorbing body formed on the baffle plate can absorb the reverse current. It is also possible to reduce the manufacturing cost of the electrolytic cell owing to the baffle plate serving as the substrate in the reverse current absorbing member.

As mentioned above, the position of the reverse current absorbing body according to the present embodiment is not limited. The reverse current absorbing body is preferably disposed on the current collector, from the viewpoint that a small amount of the reverse current absorbing body exerts a sufficient reverse current absorbing effect. It is more preferred to adjust the installation position on the current collector as mentioned later.

Examples of the method for producing the reverse current absorbing body include a CVD method, a PVD method, a thermal decomposition method, and a thermal spraying method. The thermal spraying method is classified by the heat source or the material to be sprayed, and specific examples thereof include flame spraying, high velocity flame spraying, arc spraying, plasma spraying, wire explosion spraying, and cold spraying. These methods may be combined. The reverse current absorbing member is obtained by forming the reverse current absorbing body on the substrate by these methods. In addition, the reverse current absorbing member (or the reverse current absorbing body) may be subjected to a reduction treatment, if necessary. In the present embodiment, the reverse current absorbing body is preferably a layer prepared by reducing NiO. Examples of the reduction treatment method include a method in which a reductant such as hydrogen or hydrazine is brought into direct contact with the reverse current absorbing body, and a method in which the reverse current absorbing body is electrochemically reduced. Specific examples of the method for producing the reverse current absorbing body include a method in which nickel oxide powder, metallic nickel powder, or Raney nickel powder is thermally sprayed onto the substrate surface. The substrate thus thermally sprayed with the powder may be subjected to the hydrogen reduction or the electrolytic reduction. The electrolytic reduction may be performed as the electrolysis of an alkali metal compound at the time of using the reverse current absorbing body. In the case of performing the electrolytic reduction at the time of using the reverse current absorbing body, the electrolysis of the aqueous solution of sodium hydroxide is preferably performed, for example, at a current density of 0.1 to 15 kA/m$^2$. At this time, the hydrogen generation reaction mostly proceeds on the cathode but does not proceed on the reverse current absorbing body. However, since the reverse current absorbing body is electrically connected to the cathode, the electric potential of the reverse current absorbing body is maintained at the hydrogen generation potential so that the reverse current absorbing body is exposed to the reducing atmosphere. The electrolytic reduction may be performed by such a method. Alternatively, the electrolytic reduction may be performed using the reverse current absorbing body as the cathode for hydrogen generation of the electrolysis of an alkali metal compound. In the case of performing the electrolytic reduction using the reverse current absorbing body as the cathode for hydrogen generation, the electrolysis of the aqueous solution of sodium hydroxide is preferably performed, for example, at a current density of 0.1 to 15 kA/m$^2$.

(Positional Relationship Between Reverse Current Absorbing Body and Cathode)

The present inventors have investigated the electric potential distribution of the cathode during the reverse current flow, and consequently revealed an effect of preventing the cathode potential not only in a portion that faces the reverse current absorbing body but in the neighborhood thereof from becoming noble.

From this observed effect of preventing the cathode potential in the neighborhood of the portion in which the reverse current absorbing body is installed from becoming noble, the present inventors have found out that the effect described above can be obtained even by installing reverse current absorbing bodies having a strip-like shape or a round shape such that the reverse current absorbing bodies are scattered in the cathode chamber.

The electrolytic cell having the configuration shown in FIG. 1, i.e., the case where the reverse current absorbing body is disposed on the current collector, will be taken as an example. The density at which reverse current absorbing bodies are disposed can be represented by the ratio of sum S2 of the areas of the reverse current absorbing bodies on the current collector to area S1 of the cathode-facing surface of the substrate (i.e., the cathode-facing surface of the current collector). S2/S1 is preferably 0.05 to 0.9, more preferably 0.1 to 0.8, still more preferably 0.2 to 0.7. When the ratio satisfies the range mentioned above, a small amount of the reverse current absorbing body tends to produce a sufficient reverse current absorbing effect.

The present inventors have further confirmed the detailed electric potential distribution of the cathode while the reverse current flowed. As a result, the present inventors have revealed that the electric potential of the cathode is not uniform in the vertical and horizontal directions, and found out that a large electric potential distribution occurs particularly in the vertical direction and the electric potential can be more noble in a portion closer to the top of the cathode.

The cause of the electric potential distribution in one cathode is not intended to be limited by a specific mechanism of action, but is presumably as follows.

When the electric potential distribution of the anode installed in the anode chamber that faces the cathode chamber via the ion exchange membrane is measured, a large electric potential distribution occurs particularly in the vertical direction, as in the cathode. This may be partly because the dissolved chlorine concentration is increased in the upper portion of the anode chamber. The upper portion of the cathode is prone to have a noble electric potential and is susceptible to oxidative degradation. On the other hand, it can be considered that the lower portion of the cathode is less prone to have a noble electric potential and is less susceptible to oxidative degradation. In other words, the degradation of the cathode due to the reverse current can be prevented throughout the cathode by increasing the density at which reverse current absorbing bodies are disposed at a position corresponding to the upper portion of the cathode, even if reverse current absorbing bodies are not installed at positions corresponding to the whole surface inside the cathode chamber.

As shown in FIG. 2, preferably 20% or more, more preferably 30% or more, still more preferably 40% or more, of the reverse current absorbing bodies are present at the position I. When the density satisfies the range mentioned above, particularly a small amount of the reverse current absorbing body tends to produce a sufficient reverse current absorbing effect. In the electrolytic cell of the present embodiment, the value of h is not particularly limited and can be, for example, 95 mm to 1600 mm. The width of the electrolytic cell is not particularly limited and can be a size of, for example, 110 mm to 3800 mm.

(Partition Wall)

The partition wall 30, also called separator, is disposed between the anode chamber 10 and the cathode chamber 20 and separates between the anode chamber 10 and the cathode chamber 20. A partition wall known as a separator for electrolysis can be used as the partition wall 30, and examples thereof include a partition wall obtained by welding a nickel plate at the cathode side and a titanium plate at the anode side.

(Anode Chamber)

The anode chamber 10 has anode 11. In addition, the anode chamber 10 preferably has: an anode side electrolyte solution supply unit which supplies an electrolyte solution to the anode chamber 10; a baffle plate disposed upward the anode side electrolyte solution supply unit and substantially parallel or diagonal to the partition wall 30, and an anode side gas liquid separation unit which separates gas from an electrolyte solution mixed with the gas, the anode side gas liquid separation unit being disposed upward the baffle plate.

(Anode)

The anode 11 is provided in the frame of the anode chamber 10. A metal electrode such as the so-called DSA® (De Nora Permelec Ltd.) can be used as the anode 11. The DSA is a titanium substrate having a surface coated with an oxide having ruthenium, iridium, and titanium as a component.

In the present embodiment, the distance between the anode and the reverse current absorbing member in the electrolyzer is preferably 35 mm to 0.1 mm from the viewpoint of the damage of the ion exchange membrane that is used as a membrane.

(Anode Side Electrolyte Solution Supply Unit)

The anode side electrolyte solution supply unit supplies an electrolyte solution to the anode chamber 10, and is connected to the electrolyte solution supply tube. The anode side electrolyte solution supply unit is preferably disposed downward the anode chamber 10. For example, a pipe having an aperture portion formed on the surface (dispersion pipe) can be used as the anode side electrolyte solution supply unit. The pipe is more preferably disposed along the surface of the anode 11 and parallel to the bottom part of the electrolytic cell. In the example shown in FIG. 2, the bottom part of the electrolytic cell agrees with the bottom 19A of the anode chamber and the bottom 19C of the cathode chamber. This pipe is connected to the electrolyte solution supply tube (liquid supply nozzle) which supplies an electrolyte solution into the electrolytic cell 1. The electrolyte solution supplied from the liquid supply nozzle is conveyed into the electrolytic cell 1 by the pipe and supplied to the inside of the anode chamber 10 through an aperture portion provided on the surface of the pipe. The pipe is preferably disposed along the surface of the anode 11 and parallel to the bottom 19A of the anode chamber because an electrolyte solution can be uniformly supplied to the inside of the anode chamber 10.

(Anode Side Gas Liquid Separation Unit)

The anode side gas liquid separation unit is preferably disposed upward the baffle plate. The anode side gas liquid separation unit has a function of separating the produced gas such as chlorine gas from the electrolyte solution during the electrolysis. Unless otherwise specified, the upper means the upward direction in the electrolytic cell 1 of FIG. 1 and the lower means downward direction in the electrolytic cell 1 of FIG. 1.

At the time of electrolysis, vibration may occur by the pressure fluctuation inside the electrolytic cell 1 when the produced gas generated in the electrolytic cell 1 and the electrolyte solution are discharged out of the system in a mixed phase (gas-liquid mixed phase), causing physical damage of the ion exchange membrane. In order to suppress this, an anode side gas liquid separation unit for separating a gas from a liquid is preferably provided in the electrolytic cell 1 of the present embodiment. A defoaming plate for clearing bubbles is preferably installed in the anode side gas liquid separation unit. The bubbles may burst when the gas-liquid mixed phase flow passes through the defoaming plate, and thus the gas can be separated from the electrolyte solution. As a result, vibration at the time of electrolysis can be prevented.

(Baffle Plate)

The baffle plate is preferably disposed upward the anode side electrolyte solution supply unit and substantially parallel or diagonal to the partition wall 30. The baffle plate is a partition plate which controls the flow of electrolyte solution in the anode chamber 10. The electrolyte solution (salt water or the like) in the anode chamber 10 is internally circulated by providing the baffle plate so that the concentration thereof can be uniform. In order to cause the internal circulation, the baffle plate is preferably disposed so as to separate the space in the vicinity of the anode 11 from the space in the vicinity of partition wall 30. From this point of view, the baffle plate is preferably provided so as to face the respective surfaces of the anode 11 and the partition wall 30. The concentration of the electrolyte solution (salt water concentration) decreases as the electrolysis proceeds and the produced gas such as chlorine gas is generated in the space in the vicinity of the anode separated by the baffle plate. This causes difference in specific gravity of the gas and the liquid in the space in the vicinity of the anode 11 and the space in the vicinity of the partition wall 30 separated by the baffle plate. By using this, the internal circulation of the electrolyte solution in the anode chamber 10 is promoted so that the concentration distribution of the electrolyte solution in the anode chamber 10 can be more uniform.

A current collector may be separately provided in the inside of the anode chamber 10 although not shown in FIG. 1. The current collector may have the same material or constitution as that of the current collector of the cathode chamber mentioned later. The anode 11 itself can also function as a current collector in the anode chamber 10.

(Cathode Chamber)

The cathode chamber 20 has cathode 21 and a reverse current absorbing body, and the cathode 21 and the reverse current absorbing body are electrically connected. The cathode chamber 20 also preferably has a cathode side electrolyte solution supply unit, a cathode side gas liquid separation unit, and a baffle plate, as in the anode chamber 10. The description on the same parts as the respective parts constituting the anode chamber 10 among the respective parts constituting the cathode chamber 20 will be omitted.

(Current Collector)

The cathode chamber 20 preferably comprises current collector 23. This enhances a current collecting effect. In the example shown in FIG. 1, the current collector 23 has a plate-like shape. In the present embodiment, the current collector is preferably disposed such that its surface is substantially parallel to the surface of the cathode 21. Such a current collector tends to produce a current collecting effect while suppressing the deformation of the metal elastic body mentioned later.

The current collector 23 is preferably made of, for example, a metal exhibiting electrical conductivity, such as nickel, iron, copper, silver, or titanium. The current collector 23 may be a mixture, an alloy, or a composite oxide of these metals. The shape of the current collector 23 may be any shape that functions as a current collector, and may be a reticular shape.

(Metal Elastic Body)

When the metal elastic body 22 is installed between the current collector 23 and the cathode 21, the respective cathodes 21 of a plurality of electrolytic cells 1 connected in series are pressed against the ion exchange membrane 2 to decrease the distance between the respective anodes 11 and the respective cathodes 21. This can decrease the voltage applied to whole of the plurality of electrolytic cells 1 connected in series. The electric power consumption can be decreased as the voltage decreases. The metal elastic body thus configured can take a constitution of zero-gap base while maintaining current efficiency.

A spring member such as spiral spring or coil, a cushioning mat, or the like can be used as the metal elastic body 22. An appropriately suitable metal elastic body can be adopted as the metal elastic body 22 in consideration of the stress pressed against the ion exchange membrane, etc. The metal elastic body 22 may be provided on the surface of the current collector 23 of the cathode chamber 20 side or on the surface of the partition wall on the anode chamber 10 side. The metal elastic body 22 is preferably provided between the current collector 23 and the cathode 21 of the cathode chamber 20 from the viewpoint of the strength or the like of the frame, because the two chambers are usually partitioned such that the cathode chamber 20 is smaller than the anode chamber 10. In addition, the metal elastic body 22 is preferably made of a metal exhibiting electrical conductivity, such as nickel, iron, copper, silver, or titanium.

(Support)

The cathode chamber 20 preferably comprises support 24 electrically connecting the current collector 23 and the partition wall 30. This can allow the current to efficiently flow.

The support 24 is preferably made of a metal exhibiting electrical conductivity, such as nickel, iron, copper, silver, or titanium. In addition, the shape of the support 24 may be any shape that can support the current collector 23, and may be a rod-like shape, a plate-like shape, or a reticular shape. In the aspect shown in FIG. 1, the support 24 is a plate-like shape and preferably has a configuration in which a metal plate is bent into an L shape. A plurality of supports 24 are disposed between partition wall 30 and the current collector 23. The plurality of supports 24 are lined up such that the respective surfaces thereof are parallel to each other. The support 24 is substantially perpendicularly disposed with respect to the partition wall 30 and the current collector 23.

(Baffle Plate)

The baffle plate is preferably disposed upward the cathode side electrolyte solution supply unit and substantially parallel or diagonal to the partition wall 30. The baffle plate is a partition plate which controls the flow of electrolyte solution in the cathode chamber 20. The electrolyte solution (caustic solution or the like) in the cathode chamber 20 is internally circulated by providing the baffle plate so that the concentration thereof can be uniform. In order to cause the internal circulation, the baffle plate is preferably disposed so as to separate the space in the vicinity of the cathode 21 from the space in the vicinity of partition wall 30. From this point of view, the baffle plate is preferably provided so as to face the respective surfaces of the cathode 21 and the partition wall 30. The concentration of the electrolyte solution (caustic concentration) decreases as the electrolysis proceeds and the produced gas such as hydrogen gas is generated in the space in the vicinity of the cathode separated by the baffle plate. This causes difference in specific gravity of the gas and the liquid in the space in the vicinity of the cathode 21 and the space in the vicinity of the partition wall 30 separated by the baffle plate. By using this, the internal circulation of the electrolyte solution in the cathode chamber 20 is promoted so that the concentration distribution of the electrolyte solution in the cathode chamber 20 can be more uniform.

(Anode Side Gasket and Cathode Side Gasket)

Anode side gasket 51 is preferably disposed on the surface of the frame constituting the anode chamber 10. Cathode side gasket 50 is preferably disposed on the surface of the frame constituting the cathode chamber 20. The electrolytic cells are connected to each other such that the ion exchange membrane 2 sandwiched between the anode side gasket 51 carried by one electrolytic cell and the cathode side gasket 50 of the electrolytic cell adjacent thereto (see FIG. 3). Airtightness can be imparted to the connecting places when a plurality of electrolytic cells 1 are connected in series via the ion exchange membrane 2 by these gaskets.

The gasket seals between the ion exchange membrane and the electrolytic cell. Specific examples of the gasket include a frame-shaped rubber sheet having an aperture portion formed in the center. It is desired that the gasket should have resistance to a corrosive electrolyte solution, produced gas, or the like and be usable for a long period of time. Hence, a vulcanized product of ethylene propylene diene rubber (EPDM rubber) or ethylene propylene rubber (EPM rubber), a peroxide crosslinked product, or the like is usually used as a gasket in terms of chemical resistance and hardness. Alternatively, a gasket in which the region in contact with a liquid (wetted part) is coated with a fluorine-based resin such as polytetrafluoroethylene (PTFE) or tetrafluoroethylene perfluoroalkyl vinyl ether copolymer (PFA), may be used, if necessary. The shape of these gaskets is not particularly limited as long as the gaskets respectively have an aperture portion so as not to block the flow of the electrolyte solution. For example, a frame-shaped gasket is stuck along the periphery of each aperture portion of the anode chamber frame constituting the anode chamber 10 or the cathode chamber frame constituting the cathode chamber 20 with an adhesive or the like. For example, when two electrolytic cells 1 are connected via the ion exchange membrane 2 (see FIG. 3), each of the electrolytic cells 1 stuck with a gasket may be fastened via the ion exchange membrane 2. This can prevent the electrolyte solution, the alkali metal hydroxide generated by the electrolysis, chlorine gas, hydrogen gas, or the like from leaking out of the electrolytic cell 1.

(Ion Exchange Membrane)

The ion exchange membrane is not particularly limited, and a known ion exchange membrane can be used. In the case of, for example, producing chlorine and alkali by the electrolysis of alkali chloride or the like, a fluorine-containing ion exchange membrane is preferred from the viewpoint of excellent heat resistance, chemical resistance, or the like. Examples of the fluorine-containing ion exchange membrane include an ion exchange membrane containing a fluorine-containing polymer having a function selectively permeable the ions generated during the electrolysis and having an ion exchange group. In this context, the fluorine-containing polymer having an ion exchange group refers to a fluorine-containing polymer having an ion exchange group or an ion exchange group precursor convertible to an ion exchange group by hydrolysis. Examples of such a fluorine-containing polymer include a polymer that consists of a fluorinated hydrocarbon main chain, has a functional group convertible to an ion exchange group by hydrolysis or the like as a pendant side chain, and permits a melt process.

<Second Aspect>

The electrolytic cell according to the second aspect of the present embodiment is the same as that of the first aspect except the following differences. Hereinafter, only the differences between the first aspect and the second aspect will be described, and the description on the common subject matters of both the aspects will be omitted. According to the second aspect, it is possible to suppress the oxidation and degradation of the cathode, as in the first aspect.

FIG. 7 is a cross-sectional view of electrolytic cell 1 according to the second aspect. The electrolytic cell 1 according to the second aspect is different from the electrolytic cell 1 according to the first aspect in that the electrolytic cell 1 of the second aspect comprises neither a metal elastic body nor a current collector. The cathode chamber 20 carried by the electrolytic cell 1 of the second aspect has cathode support 24 disposed between the cathode 21 and the partition wall 30. The support 24 supports the cathode 21. The partition wall 30 is electrically connected to the cathode 21 through the cathode support 24. In other words, in the second aspect, the cathode chamber has, as the substrate, a partition wall and a cathode support supporting the cathode. The cathode support is disposed between the cathode and the partition wall, and the partition wall, the cathode support and the cathode are electrically connected. In this context, at least a part of the reverse current absorbing body is preferably disposed between the cathode and the partition wall.

In the second aspect, the reverse current absorbing body may be independent of the partition wall and the support. The reverse current absorbing body is installed, for example, between the cathode and the partition wall. The reverse current absorbing body may be electrically connected directly to the surface of the cathode or the partition wall.

At least a part of the substrate of the reverse current absorbing body is the cathode support, and the reverse current absorbing body may be formed on the surface of the cathode support. When the cathode support is electrically connected to the cathode, the reverse current absorbing body formed on the cathode support can absorb the reverse current. It is also possible to reduce the manufacturing cost of the electrolytic cell owing to the support included as a part of the reverse current absorbing member.

At least a part of the substrate of the reverse current absorbing body is the partition wall, and the reverse current absorbing body may be formed on the surface of the partition wall. When the partition wall is electrically connected to the cathode through the support, the reverse current absorbing body formed on the partition wall can absorb the reverse current. It is also possible to reduce the manufacturing cost of the electrolytic cell owing to the partition wall included as a part of the reverse current absorbing member.

<Third Aspect>

The electrolytic cell according to the third aspect of the present embodiment is the same as that of the first aspect except the following differences. Hereinafter, only the differences between the first aspect and the third aspect will be described, and the description on the common subject matters of both the aspects will be omitted. According to the third aspect, it is possible to suppress the oxidation and degradation of the cathode, as in the first aspect.

The electrolytic cell according to the third aspect can be configured, for example, as shown in FIG. 1 of Japanese Patent No. 4723250. The electrolytic cell according to the third embodiment is different from the electrolytic cells according to the first and second embodiments in that an anode chamber and a cathode chamber are not in an integral structure. The electrolytic cell of the third embodiment consists of an element constituting a bathtub-shaped anode chamber, and an element constituting a cathode chamber. A gasket and an ion exchange membrane are sandwiched between the anode chamber and the cathode chamber, and they are integrated with a bolt to prepare one unit. In the third embodiment, such units are arranged in series to prepare electrolyzer 4.

The reverse current absorbing body is disposed in the cathode chamber in the same manner as in the first aspect.

EXAMPLES

Hereinafter, the present embodiment will be described in more detail with reference to Examples. The present embodiment is not intended to be limited by the following Examples.

Example 1

Nickel expanded metal was used as a metal porous plate. The nickel plate having a thickness of 1 mm was processed at SW=3, LW=4, and feed=1. The thickness after the processing was 1.2 mm. This nickel expanded metal was blast treated with steel grit (particle No. 70, particle size range: 420 μm to 1000 μm).

A mixed liquid consisting of nickel oxide powder, gum arabic, and pure water was spray dried to prepare spherical granules having a particle size of 5 to 50 μm. The granules were thermally plasma sprayed onto the nickel expanded metal using nitrogen as primary gas and hydrogen as secondary gas. The thickness after the thermal plasma spraying was 1.6 mm. Subsequently, a hydrogen reduction treatment was carried out at 200° C. in a hydrogen atmosphere (diluted with nitrogen). The thickness after the hydrogen reduction was not changed and was still 1.6 mm. In this manner, a reverse current absorbing body was produced.

(Measurement of Powder X-Ray Diffraction of Reverse Current Absorbing Layer)

The measurement of a powder X-ray diffraction pattern was carried out by peeling off the reverse current absorbing layer from the nickel substrate, processing it into powder, and loading a glass sample plate with the powder sample. RINT2000 UltraX18 (Rigaku Corporation) was used as an X-ray diffractometer. CuKα ray ($\lambda$=1.54184 angstroms) was used as an X-ray source. The measurement was performed under conditions involving an accelerating voltage of 50 kV, a current of 200 mA, a scan axis of 2θ/θ, a step interval of 0.02°, a scan speed of 2.0°/min, and measurement range 2θ=20 to 60°.

In the powder X-ray diffraction pattern, diffraction angle 2θ=44.5° is the diffraction line of Ni metal, and diffraction angle 2θ=43.28° is the diffraction line of NiO. Results of measuring the full width at half maximum of the diffraction line peak of Ni metal are shown in Table 12. The measurement of the full width at half maximum was carried out by the following procedures. The reverse current absorbing layer was peeled off from the metal porous plate and processed into powder, followed by the measurement of powder X-ray diffraction. In the obtained results, points at diffraction angle 2θ=39.5° and diffraction angle 2θ=48.5° were connected with a straight line, which was used as a baseline. A perpendicular line from the peak top of the diffraction peak of Ni metal observed around 2θ=44.5° to the baseline was drawn. A line parallel to the baseline was drawn at the midpoint between the peak top and the point of intersection of the perpendicular line and the baseline. The distance between two points of this line crossing the peak was measured and used as the full width at half maximum. The full width at half maximum was 0.33°.

The degrees of oxidation before and after the hydrogen reduction treatment or before and after preliminary electrolysis (degree X of oxidation: before the hydrogen reduction treatment or the preliminary electrolysis, degree Y of oxidation: after the hydrogen reduction or the preliminary electrolysis) are shown in Table 12. The degree of oxidation was a value calculated according to the expression given below. In predetermined Examples described below, the degree of oxidation was also measured in the same manner as described above.

Degree of oxidation=(Diffraction intensity of NiO)/
(Diffraction intensity of Ni metal+Diffraction
intensity of NiO)×100 wherein

Diffraction intensity of NiO=(Diffraction peak top
value of NiO)−(Background value)

Diffraction intensity of Ni metal=(Diffraction peak
top value of Ni metal)−(Background value)

Background value=(Count at 39.5°+Count at
48.5°)/2

The degree X of oxidation was 78%, and the degree Y of oxidation was 3.3%. In predetermined Examples described below, the measurement of X-ray diffraction was also performed in the same manner as described above.

(Evaluation of Reverse Current Absorption)

The reverse current absorbing body was cut into a size of 3 cm×3 cm and fixed to a nickel rod coated with PTFE with nickel screws. A platinum mesh was used as a counter electrode (anode).

A 32% by weight aqueous solution of sodium hydroxide was placed in a PFA beaker and warmed to 90° C., and the reverse current absorbing body and the platinum mesh were installed therein. The electric current was applied for 1 hour between the reverse current absorbing body and the platinum mesh to generate hydrogen on the reverse current absorbing body by the electrolysis of the aqueous solution of sodium hydroxide. The current density at the time of the electrolysis was 4 kA/m$^2$. Thereafter, the electric potential of the reverse current absorbing body was measured while applying the reverse current having a current density of 250 A/m between the platinum mesh and the reverse current absorbing body. The electric potential of the reverse current absorbing body is the electric potential of the reverse current absorbing body with respect to the Ag|AgCl reference electrode, and a Luggin tube was used for the measurement of the electric potential. Time T (sec) from when the reverse current started to flow to when the electric potential of the reverse current absorbing body reached the electric potential of the oxidative dissolution reaction of Ru (−0.1 V vs. Ag|AgCl) was measured. The electric quantity flowed between the platinum mesh and the reverse current absorbing body (quantity of the reverse current absorbed by the reverse current absorbing body, unit: C/m$^2$) was calculated from the time T and the product of the time T and the current density of 250 A/m$^2$ in Example 1, and is shown in Table 12. The time T was 2234 seconds, and the quantity of the reverse current absorbed was 558500 C/m$^2$. In predetermined Examples described below, the time T and the quantity of the reverse current absorbed were also measured in the same manner as described above.

(Measurement of Specific Surface Area)

The specific surface area, pore size distribution curve, and pore volume of the reverse current absorbing layer of Examples were measured using "TriStar II 3020 (nitrogen gas adsorption measuring device)" manufactured by Shimadzu Corporation. The pretreatment was performed by vacuum drying at a pressure of 200 mTorr or lower under conditions of 80° C. for 2 hours. The measurement results are shown in Table 12. These measurements were performed with regard to the reverse current absorbing layer which was peeled off from the metal porous plate and processed into powder. The results are shown in Table 12. The specific surface area was 3.3 m$^2$/g, and the proportion of the pore volume of the pores having a pore size of 10 nm or greater to the total pore volume was 94%. In predetermined Examples described below, the specific surface area was also measured in the same manner as described above.

(Electrolysis Experiment Using Large Size Electrolyzer)

The electrolysis experiment was carried out using a cell having the same size as that of a zero-gap base electrolytic cell for use in commercial plants. In this Example, an electrolytic cell having the structure disclosed in Japanese Patent No. 4453973 was used as one example. The electrolytic cell was used after 1 year of use. In this electrolysis test, an electrolyzer was used in which 10 pairs of such electrolytic cells were arranged in series. In the electrolytic cell used, the distance between the current collector and the anode was about 4.5 nm when the electrolyzer was assembled. In other words, the electrolytic cell had a structure where the reverse current absorbing body, an elastic mattress, the cathode, and the ion exchange membrane were held at this interval of 4.5 mm, and the cathode and the current collector had the same area and faced each other in parallel. In other words, the positions at the top and the bottom of the cathode chamber agreed with the positions at the top and the bottom, respectively, of the current collector, and the heights for the cathode chamber (height 0, height h, position I and position II according to the present embodiment) were determined by the heights for the current collector (in Examples 1 to 4, 4-1, and 13 and Comparative Example 1, two materials having a size of 1150 mm in length×1190 mm in width were juxtaposed and installed) (the same holds true for the description below).

The cathode and a cushion mat to be installed in the cathode chamber of the electrolytic cell were temporarily removed, and two reverse current absorbing bodies having a size of 230 mm in length×1190 mm in width were attached onto the current collector made of nickel expanded metal by TIG welding. For the attachment, each of the reverse current absorbing bodies was attached to 0 mm from the upper side of the current collector, i.e., a position that allowed the upper side of the reverse current absorbing body to overlap the upper side of the current collector (FIG. 8). The removed cushion mat and cathode were re-attached thereonto.

A woven fabric prepared using nickel wire of 0.1 mm and processed into wave shape was fixed as the cushion mat to the current collector by spot welding. A 40-mesh wire mesh with a line shape of 0.15 mm coated with ruthenium as a main component was laminated and fixed as the cathode for hydrogen generation onto the cushion mat.

So-called DSA®, a titanium substrate coated with an oxide having ruthenium, iridium, and titanium as a component, was used as the anode.

"Aciplex"® F6801 (manufactured by Asahi Kasei Chemicals Corporation) was used as the ion exchange membrane.

Salt electrolysis was carried out at a current density of 4 kA/m$^2$ while adjustment was made such that the NaCl concentration of the anode chamber exit was 3.5 N±0.2 N, the NaOH concentration of the cathode chamber exit was 32% by weight±1% by weight, and the temperature was 88° C.±1° C. The electrolysis was temporarily stopped after 2 hours from the start of the electrolysis, and the reverse current was forced to flow. After the flow of the predetermined reverse current, the salt electrolysis was restarted at a current density of 4 kA/m$^2$. The reverse current was allowed to flow after 20 hours from the restart. Likewise, the reverse current was allowed to flow after 20 hours from the restart. Thereafter, the electrolysis was restarted at 6 kA/m$^2$ and operated for 68 hours, and the reverse current was then allowed to flow. A total of four reverse current histories were given. The conditions for the reverse current were as shown below.

Set current density of the rectifier for the reverse current=50 A/m²

Time=15 minutes

The current value was monitored for 15 minutes when the reverse current flowed. The electric quantity of the flowed reverse current was calculated and was consequently 49000 C/m². This is because a large amount of chlorine remains in the anode chamber for a few minutes when the reverse current started to flow, and destabilizes the electric current.

The electrolyzer thus given the four reverse current histories was temporarily dismantled, and the remaining amount of ruthenium in the hydrogen generating cathode was measured using a handy type fluorescent X-ray analysis apparatus (Niton XL3t-800S, Thermo Fisher Scientific Inc.) to calculate the residual rate of ruthenium after the electrolysis test (measurement A).

After the coating measurement, the electrolyzer was reassembled and subjected to salt electrolysis. The electrolysis was continuously performed for a total of 23 days involving 5 days at a current density of 4 kA/m² and 18 days at a current density of 6 kA/m². Thereafter, the electrolyzer was dismantled, and the remaining amount of ruthenium in the hydrogen generating cathode was measured using XRF (a handy type fluorescent X-ray analysis apparatus Niton XL3t-800S, Thermo Fisher Scientific Inc.) to calculate the residual rate of ruthenium after the salt electrolysis (measurement B). The residual rates of the measurements A and B were calculated on the basis of the value measured before the electrolysis test. In both the measurements A and B described above, 30 points shown in FIG. 9 were measured.

Although the sodium hydroxide solution discharged from the cathode exit was visually observed with each of the four applications of the reverse current, coloring or the like was not observed. The results of the measurement A are shown in Table 1. The residual rate of ruthenium was 99% or more at almost all the measurement points. The average value from the 30 points was 98%.

Subsequently, the ion exchange membrane used was taken out, and the presence or absence of membrane damage such as peeling, foaming, or crushing was observed. All the damaged places, also including very slightly ones, were added up. In the membrane observation results, a level with no problem in electrolysis performance was assessed as ○, a level that might cause a problem in the long term was assessed as Δ, and a level with a problem was assessed as X. Specifically, a total of 260 or less damaged places were assessed as ○, a total of more than 260 and 310 or less damaged places were assessed as Δ, and a total of 310 or more damaged places were assessed as X. In predetermined Examples described below, the presence or absence of the damage of the ion exchange membrane was evaluated in the same manner as described above. The results about Example 1 were ○.

TABLE 1

| Measurement position | Residual rate/% |
|---|---|
| 1 | 100 |
| 2 | 100 |
| 3 | 100 |
| 4 | 99 |
| 5 | 96 |
| 6 | 92 |
| 7 | 100 |
| 8 | 99 |
| 9 | 100 |
| 10 | 95 |
| 11 | 95 |
| 12 | 95 |
| 13 | 100 |
| 14 | 100 |
| 15 | 100 |
| 16 | 100 |
| 17 | 93 |
| 18 | 93 |
| 19 | 100 |
| 20 | 100 |
| 21 | 100 |
| 22 | 100 |
| 23 | 100 |
| 24 | 97 |
| 25 | 100 |
| 26 | 100 |
| 27 | 100 |
| 28 | 100 |
| 29 | 97 |
| 30 | 97 |

The results of the measurement B are shown in Table 2. The residual rate of ruthenium was 99% or more at almost all the measurement points. The average value from the 30 points was 99%.

TABLE 2

| Measurement position | Residual rate/% |
|---|---|
| 1 | 100 |
| 2 | 100 |
| 3 | 100 |
| 4 | 100 |
| 5 | 96 |
| 6 | 92 |
| 7 | 100 |
| 8 | 99 |
| 9 | 100 |
| 10 | 98 |
| 11 | 93 |
| 12 | 99 |
| 13 | 100 |
| 14 | 100 |
| 15 | 100 |
| 16 | 100 |
| 17 | 98 |
| 18 | 97 |
| 19 | 100 |
| 20 | 100 |
| 21 | 100 |
| 22 | 100 |
| 23 | 98 |
| 24 | 97 |
| 25 | 100 |
| 26 | 100 |
| 27 | 100 |
| 28 | 98 |
| 29 | 95 |
| 30 | 98 |

Example 2

The electrolysis test was carried out in the same manner as in Example 1 using the same reverse current absorbing body as that of Example 1 except that the installation position was changed as shown in FIG. 10 such that the reverse current absorbing bodies were installed at a position of 165 mm from the upper side of the current collector. The results of measuring the residual rate of ruthenium after the electrolysis test are shown in Tables 3 (measurement A) and 4 (measurement B). The residual rate of ruthenium was 99% or more at almost all the measurement points. Although the sodium hydroxide solution discharged from the cathode exit was visually observed with each of the four applications of the reverse current, coloring or the like was not observed. In both the measurements, the average value from the 30 points was 100%. Thereafter, the damage of the membrane was examined by carrying out the electrolysis at a current density of 6 kA/m² for half a year. The damage of the ion exchange membrane was examined at a site facing the portion in which the reverse current absorbing body was installed, and the other sites, but was ○ in Example 2.

TABLE 3

| Measurement position | Residual rate/% |
|---|---|
| 1 | 100 |
| 2 | 98 |
| 3 | 100 |
| 4 | 100 |
| 5 | 100 |
| 6 | 100 |
| 7 | 99 |
| 8 | 100 |
| 9 | 100 |
| 10 | 100 |
| 11 | 100 |
| 12 | 100 |
| 13 | 100 |
| 14 | 98 |
| 15 | 100 |
| 16 | 100 |
| 17 | 100 |
| 18 | 100 |
| 19 | 100 |
| 20 | 100 |
| 21 | 100 |
| 22 | 97 |
| 23 | 100 |
| 24 | 100 |
| 25 | 100 |
| 26 | 95 |
| 27 | 100 |
| 28 | 100 |
| 29 | 100 |
| 30 | 100 |

TABLE 4

| Measurement position | Residual rate/% |
|---|---|
| 1 | 100 |
| 2 | 100 |
| 3 | 100 |
| 4 | 100 |
| 5 | 100 |
| 6 | 100 |
| 7 | 100 |
| 8 | 100 |
| 9 | 100 |
| 10 | 100 |
| 11 | 100 |
| 12 | 100 |
| 13 | 100 |
| 14 | 100 |
| 15 | 100 |
| 16 | 100 |
| 17 | 100 |
| 18 | 100 |
| 19 | 100 |
| 20 | 98 |
| 21 | 100 |
| 22 | 100 |
| 23 | 100 |
| 24 | 100 |
| 25 | 100 |
| 26 | 97 |
| 27 | 96 |
| 28 | 100 |
| 29 | 100 |
| 30 | 100 |

Example 3

The electrolysis test was carried out in the same manner as in Example 1 using the same reverse current absorbing body as that of Example 1 except that the installation position of the reverse current absorbing body was changed as shown in FIG. 11 such that the reverse current absorbing bodies were installed at a position of 265 mm from the upper side of the current collector. The results of measuring the residual rate of ruthenium after the electrolysis test are shown in Tables 5 (measurement A) and 6 (measurement B). The residual rate of ruthenium was 99% or more at almost all the measurement points. Although the sodium hydroxide solution discharged from the cathode exit was visually observed with each of the four applications of the reverse current, coloring or the like was not observed. In both the measurements, the average value from the 30 points was 100%. Thereafter, the damage of the membrane was examined by carrying out the electrolysis at a current density of 6 kA/m² for half a year. The damage of the ion exchange membrane was examined at a site facing the portion in which the reverse current absorbing body was installed, and the other sites, but was ○ in Example 3.

TABLE 5

| Measurement position | Residual rate/% |
|---|---|
| 1 | 100 |
| 2 | 100 |
| 3 | 98 |
| 4 | 100 |
| 5 | 100 |
| 6 | 100 |
| 7 | 100 |
| 8 | 97 |
| 9 | 100 |
| 10 | 100 |
| 11 | 100 |
| 12 | 100 |
| 13 | 100 |
| 14 | 100 |
| 15 | 100 |
| 16 | 98 |
| 17 | 100 |
| 18 | 100 |
| 19 | 100 |
| 20 | 99 |
| 21 | 100 |
| 22 | 100 |
| 23 | 100 |
| 24 | 100 |
| 25 | 100 |

TABLE 5-continued

| Measurement position | Residual rate/% |
|---|---|
| 26 | 98 |
| 27 | 100 |
| 28 | 99 |
| 29 | 100 |
| 30 | 100 |

TABLE 6

| Measurement position | Residual rate/% |
|---|---|
| 1 | 100 |
| 2 | 100 |
| 3 | 95 |
| 4 | 100 |
| 5 | 98 |
| 6 | 100 |
| 7 | 100 |
| 8 | 100 |
| 9 | 99 |
| 10 | 100 |
| 11 | 100 |
| 12 | 100 |
| 13 | 100 |
| 14 | 100 |
| 15 | 100 |
| 16 | 100 |
| 17 | 100 |
| 18 | 100 |
| 19 | 100 |
| 20 | 100 |
| 21 | 98 |
| 22 | 100 |
| 23 | 100 |
| 24 | 100 |
| 25 | 100 |
| 26 | 100 |
| 27 | 100 |
| 28 | 100 |
| 29 | 100 |
| 30 | 100 |

TABLE 7

| Measurement position | Residual rate/% |
|---|---|
| 1 | 95 |
| 2 | 100 |
| 3 | 91 |
| 4 | 95 |
| 5 | 100 |
| 6 | 100 |
| 7 | 100 |
| 8 | 99 |
| 9 | 100 |
| 10 | 100 |
| 11 | 100 |
| 12 | 98 |
| 13 | 100 |
| 14 | 100 |
| 15 | 100 |
| 16 | 98 |
| 17 | 100 |
| 18 | 100 |
| 19 | 96 |
| 20 | 96 |
| 21 | 97 |
| 22 | 100 |
| 23 | 97 |
| 24 | 100 |
| 25 | 100 |
| 26 | 100 |
| 27 | 100 |
| 28 | 99 |
| 29 | 100 |
| 30 | 100 |

TABLE 8

| Measurement position | Residual rate/% |
|---|---|
| 1 | 97 |
| 2 | 95 |
| 3 | 93 |
| 4 | 100 |
| 5 | 100 |
| 6 | 100 |
| 7 | 99 |
| 8 | 97 |
| 9 | 100 |
| 10 | 100 |
| 11 | 100 |
| 12 | 100 |
| 13 | 100 |
| 14 | 98 |
| 15 | 100 |
| 16 | 100 |
| 17 | 100 |
| 18 | 100 |
| 19 | 100 |
| 20 | 99 |
| 21 | 100 |
| 22 | 100 |
| 23 | 98 |
| 24 | 100 |
| 25 | 99 |
| 26 | 100 |
| 27 | 100 |
| 28 | 100 |
| 29 | 96 |
| 30 | 100 |

Example 4

The electrolysis test was carried out in the same manner as in Example 1 using the same reverse current absorbing body as that of Example 1 except that the installation position of the reverse current absorbing body was changed as shown in FIG. 12 such that the reverse current absorbing bodies were installed at a position of 365 mm from the upper side of the current collector. The results of measuring the residual rate of ruthenium after the electrolysis test are shown in Tables 7 (measurement A) and 8 (measurement B). The residual rate of ruthenium was 99% or more at almost all the measurement points. Although the sodium hydroxide solution discharged from the cathode exit was visually observed with each of the four applications of the reverse current, coloring or the like was not observed. In both the measurements, the average value from the 30 points was 99%. Thereafter, the damage of the membrane was examined by carrying out the electrolysis at a current density of 6 kA/m$^2$ for half a year. The damage of the ion exchange membrane was examined at a site facing the portion in which the reverse current absorbing body was installed, and the other sites, but was ◯ in Example 4.

Example 4-1

The electrolysis test was carried out in the same manner as in Example 1 using the same reverse current absorbing body as that of Example 1 except that the installation position of the reverse current absorbing body was changed as shown in FIG. 13 such that the reverse current absorbing bodies were installed at a position of 460 mm (just at the center of the electrolyzer) from the upper side of the current collector. The results of measuring the residual rate of ruthenium after the electrolysis test are shown in Table 9 (measurement A). Although the sodium hydroxide solution discharged from the cathode exit was visually observed with each of the four applications of the reverse current, very slight coloring was observed. The average value from the 30 points was 90%. Thereafter, the damage of the membrane was examined by carrying out the electrolysis at a current density of 6 kA/m² for half a year. The damage of the ion exchange membrane was examined at a site facing the portion in which the reverse current absorbing body was installed, and the other sites, but was ○ in Example 4-1.

TABLE 9

| Measurement position | Residual rate/% |
|---|---|
| 1 | 55 |
| 2 | 68 |
| 3 | 100 |
| 4 | 100 |
| 5 | 100 |
| 6 | 96 |
| 7 | 70 |
| 8 | 74 |
| 9 | 100 |
| 10 | 100 |
| 11 | 100 |
| 12 | 96 |
| 13 | 76 |
| 14 | 77 |
| 15 | 100 |
| 16 | 100 |
| 17 | 100 |
| 18 | 100 |
| 19 | 86 |
| 20 | 61 |
| 21 | 100 |
| 22 | 100 |
| 23 | 100 |
| 24 | 100 |
| 25 | 74 |
| 26 | 73 |
| 27 | 100 |
| 28 | 100 |
| 29 | 100 |
| 30 | 100 |

In Example 4-1, the residual rate of ruthenium up to 200 mm from the top of the cathode was 55% to 77% and exhibited a decreasing tendency, though the degradation of the cathode was able to be sufficiently suppressed when the cathode surface was evaluated as a whole. These results, taken together with the results about Examples 1 to 4, suggested that the degradation of the cathode tends to be able to be suppressed depending on the installation position of the reverse current absorbing body. In other words, the results suggested that, for also sufficiently protecting the degradation in the upper portion of the cathode, it is more preferred to install the reverse current absorbing body at a position shifted from the center of the electrolyzer toward the upper portion than to install the reverse current absorbing body at the center of the electrolyzer.

Comparative Example 1

The electrolysis test was carried out in the same manner as in Example 1 except that no reverse current absorbing body was installed. As a result of visual observation, the sodium hydroxide solution discharged from the cathode exit by each application of the reverse current was colored brown due to the dissolution of ruthenium. Thus, it was found that the cathode coating was dissolved by each application of the reverse current. The results of measuring the residual rate of ruthenium after the electrolysis test are shown in Table 10 (measurement A). The residual rate of ruthenium was drastically decreased at almost all the measurement points. The average value from the 30 points was 5%. Thereafter, the damage of the membrane was examined by carrying out the electrolysis at a current density of 6 kA/m² for half a year, but was ○ in Comparative Example 1.

TABLE 10

| Measurement position | Residual rate/% |
|---|---|
| 1 | 4 |
| 2 | 4 |
| 3 | 4 |
| 4 | 3 |
| 5 | 5 |
| 6 | 5 |
| 7 | 5 |
| 8 | 4 |
| 9 | 4 |
| 10 | 4 |
| 11 | 5 |
| 12 | 6 |
| 13 | 5 |
| 14 | 5 |
| 15 | 4 |
| 16 | 4 |
| 17 | 6 |
| 18 | 6 |
| 19 | 7 |
| 20 | 4 |
| 21 | 4 |
| 22 | 4 |
| 23 | 5 |
| 24 | 6 |
| 25 | 7 |
| 26 | 3 |
| 27 | 4 |
| 28 | 3 |
| 29 | 5 |
| 30 | 5 |

As described above, when the residual rate of ruthenium was 5% (Comparative Example 1), the elevation of a voltage was obvious. Thus, for preventing such elevation of a voltage, it is found important to adjust the residual rate of ruthenium to 10% or more.

Example 5

Nickel expanded metal was used as a metal porous plate. The nickel plate having a thickness of 0.2 mm was processed at SW=2, LW=3, and feed=0.2 and then subjected to a rolling treatment to adjust the thickness to 0.2 mm. The longitudinal length was 230 mm, and the horizontal length was 11.90 mm. This nickel expanded metal was blast treated with steel grit (particle No. 20, particle size range: 75 μm to 300 μm).

A mixed liquid consisting of nickel oxide powder, gum arabic, and pure water was spray dried to prepare spherical granules having a particle size of 5 to 50 μm. The granules were thermally plasma sprayed onto the nickel expanded metal using nitrogen as primary gas and hydrogen as secondary gas. The thickness after the thermal plasma spraying was 0.59 mm. In this manner, four reverse current absorbing bodies were produced. In Example 5, the reduction treatment of Example 1 was not performed, and instead, salt electrolysis was carried out as preliminary electrolysis at a current density of 4 kA/m² at a temperature of 88° C. for about 100 hours to reduce the reverse current absorbing body. The reverse current absorbing body was installed between the current collector and a mattress. In other words, the reverse current absorbing body did not function as a cathode, but was exposed to the reducing atmosphere where hydrogen was generated. Thereafter, the time T to reach −0.1 V vs. Ag/AgCl was measured in the same manner as in Example 1 and was consequently 871 seconds. The quantity of the reverse current absorbed was 217750 C/m². The full width at half maximum of the X-ray diffraction of Ni metal was 0.32°. Also, the full width at half maximum of the diffraction line peak of Ni metal was 0.32°, the degree X of oxidation was 80%, the degree Y of oxidation was 51%, the specific surface area was 1.5 m²/g, and the proportion of the pore volume of the pores having a pore size of 10 nm or greater to the total pore volume was 90% (Table 12).

In the electrolytic cell used in Example 5, the distance between the current collector and the anode was about 2 mm when the electrolyzer was assembled. In other words, the electrolytic cell had a structure where the reverse current absorbing body, an elastic mattress, the cathode, and the ion exchange membrane were held at this interval of 2 mm. The electrolytic cell was used after 1 year of use, as in Example 1. In Example 5, two materials having a size of 1160 mm in length×1190 mm in width were juxtaposed and used as the current collector (the same holds true for Examples 6, 7, 8, 9, 10, 11, and 12 and Comparative Example 1-1 below). The positions at the top and the bottom of the cathode chamber agreed with the positions at the top and the bottom, respectively, of the current collector. As shown in FIG. 14, four reverse current absorbing bodies were tightly arranged such that the upper side of the reverse current absorbing body was located at a position of 250 mm from the top of the current collector in the electrolyzer. They were fixed by TIG welding. The surface on which the four reverse current absorbing bodies were installed was 460 mm in length and 2380 mm in width. The distance between the lower side of the reverse current absorbing body and the bottom of the current collector was 450 mm.

After the preliminary electrolysis mentioned above, the electrolysis test was carried out using the electrolyzer in the same manner as in Example 1. As a result of carrying out the measurement A, the average value from the 30 points was 100%.

Although the damage of the ion exchange membrane was examined at a site facing the portion in which the reverse current absorbing body was installed, and the other sites, no membrane damage was observed. Thereafter, the damage of the membrane was examined by carrying out the electrolysis at a current density of 6 kA/m² for half a year. The damage of the ion exchange membrane was examined at the site facing the portion in which the reverse current absorbing body was installed, and the other sites, but was ○ in Example 5.

Example 6

Nickel expanded metal was used as a metal porous plate. The nickel plate having a thickness of 0.3 mm was processed at SW=2, LW=4, and feed=0.3 and then subjected to a rolling treatment to adjust the thickness to 0.3 mm. The width was 230 mm, and the length was 1190 mm. This nickel expanded metal was blast treated with steel grit (particle No. 20, particle size range: 75 μm to 300 μm).

A mixed liquid consisting of nickel oxide powder, gum arabic, and pure water was spray dried to prepare spherical granules having a particle size of 5 to 50 Cm. The granules were thermally plasma sprayed onto the nickel expanded metal using nitrogen as primary gas and hydrogen as secondary gas. The thickness after the thermal plasma spraying was 0.66 mm. In this manner, four reverse current absorbing bodies were produced. In Example 6, the reduction treatment of Example 1 was not performed, and instead, salt electrolysis was carried out as preliminary electrolysis at a current density of 4 kA/m² at a temperature of 88° C. for about 100 hours to reduce the reverse current absorbing body. The reverse current absorbing body was installed between the current collector and a mattress. In other words, the reverse current absorbing body did not function as a cathode, but was exposed to the reducing atmosphere where hydrogen was generated. Thereafter, the time T to reach −0.1 V vs. Ag/AgCl was measured in the same manner as in Example 1 and was consequently 1051 seconds. The quantity of the reverse current absorbed was 262750 C/m². Also, the full width at half maximum of the diffraction line peak of Ni metal was 0.32°, the degree X of oxidation was 80%, the degree Y of oxidation was 57%, the specific surface area was 1.7 m²/g, and the proportion of the pore volume of the pores having a pore size of 10 nm or greater to the total pore volume was 91% (Table 12).

Four reverse current absorbing bodies were installed in the electrolyzer in the same manner as in Example 5. In Example 6, after the preliminary electrolysis mentioned above, the electrolysis test was carried out using the electrolyzer in the same manner as in Example 1. As a result of carrying out the measurement A, the average value from the 30 points was 100%.

Although the damage of the ion exchange membrane was examined at a site facing the portion in which the reverse current absorbing body was installed, and the other sites, no membrane damage was observed. Thereafter, the damage of the membrane was examined by carrying out the electrolysis at a current density of 6 kA/m² for half a year. The damage of the ion exchange membrane was examined at the site facing the portion in which the reverse current absorbing body was installed, and the other sites, but was ○ in Example 6.

Comparative Example 1-1

The reverse current absorbing bodies produced in Example 6 were attached with no space to the whole surface of the current collector by welding. The electrolysis evaluation was carried out in the same manner as in Example 1. As a result of carrying out the measurement A, the average value from the 30 points was 100%.

Thereafter, the damage of the membrane was examined by carrying out the electrolysis at a current density of 6 kA/m² for half a year. The results were X in Comparative Example 1-1.

Example 7

Nickel expanded metal was used as a metal porous plate. The nickel plate having a thickness of 0.2 mm was processed at SW=2, LW=3, and feed=0.5 and then subjected to a rolling treatment to adjust the thickness to 0.2 mm. The width was 230 mm, and the length was 11.90 mm. This nickel expanded metal was blast treated with steel grit (particle No. 20, particle size range: 75 μm to 300 μm).

A mixed liquid consisting of nickel oxide powder, gum arabic, and pure water was spray dried to prepare spherical granules having a particle size of 5 to 50 μm. The granules were thermally plasma sprayed onto the nickel expanded metal using nitrogen as primary gas and hydrogen as secondary gas. The thickness after the thermal plasma spraying was 0.49 mm. In this manner, four reverse current absorbing bodies were produced. In Example 7, the reduction treatment of Example 1 was not performed, and instead, salt electrolysis was carried out as preliminary electrolysis at a current density of 4 kA/m$^2$ at a temperature of 88° C. for about 100 hours to reduce the reverse current absorbing body. The reverse current absorbing body was installed between the current collector and a mattress. In other words, the reverse current absorbing body did not function as a cathode, but was exposed to the reducing atmosphere where hydrogen was generated. Thereafter, the time T to reach −0.1 V vs. Ag/AgCl was measured in the same manner as in Example 1 and was consequently 972 seconds. The quantity of the reverse current absorbed was 243000 C/m$^2$. Also, the full width at half maximum of the diffraction line peak of Ni metal was 0.34°, the degree X of oxidation was 80%, the degree Y of oxidation was 52%, the specific surface area was 1.7 m$^2$/g, and the proportion of the pore volume of the pores having a pore size of 10 nm or greater to the total pore volume was 91% (Table 12).

Four reverse current absorbing bodies were installed in the electrolyzer in the same manner as in Example 5. In Example 7, after the preliminary electrolysis mentioned above, the electrolysis evaluation was carried out using the electrolyzer in the same manner as in Example 1. As a result of carrying out the measurement A, the average value from the 30 points was 100%.

Although the damage of the ion exchange membrane was examined at a site facing the portion in which the reverse current absorbing body was installed, and the other sites, no membrane damage was observed. Thereafter, the damage of the membrane was examined by carrying out the electrolysis at a current density of 6 kA/m$^2$ for half a year. The damage of the ion exchange membrane was examined at the site facing the portion in which the reverse current absorbing body was installed, and the other sites, but was ○ in Example 7.

Example 8

The reverse current absorbing body was produced in the same manner as in Example 7 and then subjected to a hydrogen reduction treatment at 200° C. in a hydrogen atmosphere (diluted with nitrogen) without carrying out preliminary electrolysis.

The time T to reach −0.1 V vs. Ag/AgCl was 938 seconds, and the quantity of the reverse current absorbed was 234500 C/m$^2$. Also, the full width at half maximum of the X-ray diffraction of Ni metal was 0.36°, the degree X of oxidation was 80%, the degree Y of oxidation was 2.5%, the specific surface area was 1.9 m$^2$/g, and the proportion of the pore volume of the pores having a pore size of 10 nm or greater to the total pore volume was 93% (Table 12).

Four reverse current absorbing bodies were installed in the electrolyzer in the same manner as in Example 5. As a result of carrying out the measurement A after the electrolysis test, the average value from the 30 points was 100%.

Although the damage of the ion exchange membrane was examined at a site facing the portion in which the reverse current absorbing body was installed, and the other sites, no membrane damage was observed. Thereafter, the damage of the membrane was examined by carrying out the electrolysis at a current density of 6 kA/m$^2$ for half a year. The damage of the ion exchange membrane was examined at the site facing the portion in which the reverse current absorbing body was installed, and the other sites, but was ○ in Example 8.

Example 9

Nickel expanded metal was used as a metal porous plate. The nickel plate having a thickness of 0.2 mm was processed at SW=1.8, LW=3, and feed=0.5 and then subjected to a rolling treatment to adjust the thickness to 0.2 mm. The width was 230 mm, and the length was 1190 mm. This nickel expanded metal was blast treated with steel grit (particle No. 20, particle size range: 75 μm to 300 μm).

A mixed liquid consisting of nickel oxide powder, gum arabic, and pure water was spray dried to prepare spherical granules having a particle size of 5 to 50 μm. The granules were thermally plasma sprayed onto the nickel expanded metal using nitrogen as primary gas and hydrogen as secondary gas. The thickness after the thermal plasma spraying was 0.47 mm. In this manner, four reverse current absorbing bodies were produced. In Example 9, the reduction treatment of Example 1 was not performed, and instead, salt electrolysis was carried out as preliminary electrolysis at a current density of 4 kA/m$^2$ at a temperature of 88° C. for about 100 hours to reduce the reverse current absorbing body. The reverse current absorbing body was installed between the current collector and a mattress. In other words, the reverse current absorbing body did not function as a cathode, but was exposed to the reducing atmosphere where hydrogen was generated. Thereafter, the time T to reach −0.1 V vs. Ag/AgCl was measured and was consequently 1017 seconds. The quantity of the reverse current absorbed was 254250 C/m$^2$. Also, the full width at half maximum of the diffraction line peak of Ni metal was 0.34°, the degree X of oxidation was 81%, the degree Y of oxidation was 55%, the specific surface area was 1.6 m$^2$/g, and the proportion of the pore volume of the pores having a pore size of 10 nm or greater to the total pore volume was 90% (Table 12).

Four reverse current absorbing bodies were installed in the electrolyzer in the same manner as in Example 5. In Example 9, after the preliminary electrolysis mentioned above, the electrolysis test was carried out using the electrolyzer in the same manner as in Example 1. As a result of carrying out the measurement A, the average value from the 30 points was 100%.

Although the damage of the ion exchange membrane was examined at a site facing the portion in which the reverse current absorbing body was installed, and the other sites, no membrane damage was observed. Thereafter, the damage of the membrane was examined by carrying out the electrolysis at a current density of 6 kA/m$^2$ for half a year. The damage of the ion exchange membrane was examined at the site facing the portion in which the reverse current absorbing body was installed, and the other sites, but was ○ in Example 9.

Example 10

The reverse current absorbing body was produced in the same manner as in Example 9 and then subjected to a hydrogen reduction treatment at 200° C. in a hydrogen atmosphere (diluted with nitrogen) without performing preliminary electrolysis.

The time T to reach −0.1 V vs. Ag/AgCl was 1032 seconds, and the quantity of the reverse current absorbed was 258000 C/m$^2$. Also, the full width at half maximum of the X-ray diffraction of Ni metal was 0.45°, the degree X of oxidation was 81%, the degree Y of oxidation was 2.4%, the specific surface area was 2.0 m$^2$/g, and the proportion of the pore volume of the pores having a pore size of 10 nm or greater to the total pore volume was 92% (Table 12).

Four reverse current absorbing bodies were installed in the electrolyzer in the same manner as in Example 5. The same electrolysis test as that of Example 1 was carried out. As a result of then carrying out the measurement A, the average value from the 30 points was 100%.

Although the damage of the ion exchange membrane was examined at a site facing the portion in which the reverse current absorbing body was installed, and the other sites, no membrane damage was observed. Thereafter, the damage of the membrane was examined by carrying out the electrolysis at a current density of 6 kA/m$^2$ for half a year. The damage of the ion exchange membrane was examined at the site facing the portion in which the reverse current absorbing body was installed, and the other sites, but was ○ in Example 10.

Example 11

Nickel expanded metal was used as a metal porous plate. The nickel plate having a thickness of 0.2 mm was processed at SW=1.6, LW=3, and feed=0.5 and then subjected to a rolling treatment to adjust the thickness to 0.2 mm. The width was 230 mm, and the length was 1190 mm. This nickel expanded metal was blast treated with steel grit (particle No. 20, particle size range: 75 µm to 300 nm).

A mixed liquid consisting of nickel oxide powder, gum arabic, and pure water was spray dried to prepare spherical granules having a particle size of 5 to 50 µm. The granules were thermally plasma sprayed onto the nickel expanded metal using nitrogen as primary gas and hydrogen as secondary gas. The thickness after the thermal plasma spraying was 0.45 mm. In this manner, four reverse current absorbing bodies were produced. In Example 11, the reduction treatment of Example 1 was not performed, and instead, salt electrolysis was carried out as preliminary electrolysis at a current density of 4 kA/m$^2$ at a temperature of 88° C. for about 100 hours to reduce the reverse current absorbing body. The reverse current absorbing body was installed between the current collector and a mattress. In other words, the reverse current absorbing body did not function as a cathode, but was exposed to the reducing atmosphere where hydrogen was generated. Thereafter, the time T to reach −0.1 V vs. Ag/AgCl was measured and was consequently 751 seconds. The quantity of the reverse current absorbed was 187750 C/m$^2$. Also, the full width at half maximum of the diffraction line peak of Ni metal was 0.36°, the degree X of oxidation was 81%, the degree Y of oxidation was 56%, the specific surface area was 1.6 m$^2$/g, and the proportion of the pore volume of the pores having a pore size of 10 nm or greater to the total pore volume was 90% (Table 12).

Four reverse current absorbing bodies were installed in the electrolyzer in the same manner as in Example 5. After the preliminary electrolysis mentioned above, the electrolysis test was carried out using the electrolyzer in the same manner as in Example 1. As a result of carrying out the measurement A, the average value from the 30 points was 100%.

Although the damage of the ion exchange membrane was examined at a site facing the portion in which the reverse current absorbing body was installed, and the other sites, no membrane damage was observed. Thereafter, the damage of the membrane was examined by carrying out the electrolysis at a current density of 6 kA/m$^2$ for half a year. The damage of the ion exchange membrane was examined at the site facing the portion in which the reverse current absorbing body was installed, and the other sites, but was ○ in Example 11.

Example 12

The reverse current absorbing body was produced in the same manner as in Example 11 and then subjected to a hydrogen reduction treatment at 200° C. in a hydrogen atmosphere (diluted with nitrogen) without performing preliminary electrolysis.

The time T to reach −0.1 V vs. Ag/AgCl was 1098 seconds, and the quantity of the reverse current absorbed was 274500 C/m$^2$. Also, the full width at half maximum of the X-ray diffraction of Ni metal was 0.33°, the degree X of oxidation was 81%, the degree Y of oxidation was 1.8%, the specific surface area was 1.8 m$^2$/g, and the proportion of the pore volume of the pores having a pore size of 10 nm or greater to the total pore volume was 90% (Table 12).

Thereafter, four reverse current absorbing bodies were installed in the electrolyzer in the same manner as in Example 5. The same electrolysis test as that of Example 1 was carried out. As a result of then carrying out the measurement A, the average value from the 30 points was 100%.

Although the damage of the ion exchange membrane was examined at a site facing the portion in which the reverse current absorbing body was installed, and the other sites, no membrane damage was observed. Thereafter, the damage of the membrane was examined by carrying out the electrolysis at a current density of 6 kA/m$^2$ for half a year. The damage of the ion exchange membrane was examined at the site facing the portion in which the reverse current absorbing body was installed, and the other sites, but was ○ in Example 12.

Example 13

The same reverse current absorbing body as that of Example 1 was used. The expanded metal processing was carried out at SW=3, LW=4, and feed=1. The thickness of the reverse current absorbing body used was 1.6 n after thermal plasma spraying and a hydrogen reduction treatment.

The same electrolytic cell as that of Example 5 was used. In other words, in the electrolytic cell used, the distance between the current collector and the anode was about 2 mm when the electrolyzer was assembled. The electrolytic cell had a structure where the reverse current absorbing body, an elastic mattress, the cathode, and the ion exchange membrane were held at this interval of 2 mm. In Example 13, two materials having a size of 1150 mm in length×1190 mm in width were juxtaposed and used as the current collector. The positions at the top and the bottom of the cathode chamber agreed with the positions at the top and the bottom, respectively, of the current collector.

In Example 13, a part of the current collector was hollowed out, and the reverse current absorbing body was installed in the hollowed out part. Specifically, the region from 365 mm to 595 mm from the top of the current collector was hollowed out with a width of 2380 mm from the current collector. Two reverse current absorbing bodies having a size of 230 mm in length×1190 mm in width were inserted to the hollowed out part, and fixed onto ribs by spot welding. Since the current collector was nickel expanded metal having a thickness of 1.2 mm, the distance of the portion in which the reverse current absorbing body was installed from the anode was about 1.6 mm. As a result of carrying out the same electrolysis test as that of Example 1, the average value from the 30 points in the measurement A was 100%.

Although the damage of the ion exchange membrane was examined at a site facing the portion in which the reverse current absorbing body was installed, and the other sites, no membrane damage was observed. Thereafter, the damage of the membrane was examined by carrying out the electrolysis at a current density of 6 kA/m² for half a year. The damage of the ion exchange membrane was examined at the site facing the portion in which the reverse current absorbing body was installed, and the other sites, but was ○ in Example 13.

Example 14

An anode cell having an anode chamber installed with an anode (anode terminal cell, made of titanium) and a cathode cell having a cathode chamber installed with a cathode (cathode terminal cell, made of nickel) were combined to face each other. A pair of gaskets was disposed between the cells, and an ion exchange membrane was sandwiched between the pair of gaskets. Then, the anode cell, the gasket, the ion exchange membrane, the gasket and the cathode were tightly attached to obtain an electrolytic cell.

So-called DSA® in which an oxide having ruthenium, iridium and titanium as a component was formed on a titanium substrate was used as the anode. A nickel plain weave wire mesh coated with ruthenium oxide and cerium oxide was used as the cathode. The four sides of the cathode cut into a size of 95 mm in length×110 mm in width were bent at a right angle by about 2 mm. Nickel expanded metal was used as the current collector. The size of the current collector was 95 mm in length×110 mm in width. A cushion mat woven with a nickel thin wire having a diameter of 0.1 mm was used as the metal elastic body. The cushion mat of the metal elastic body was placed on the current collector.

The reverse current absorbing body produced in Example 6 was cut into strip-like shape of 38 mm in length and 110 mm in width and fixed to the current collector of the cathode chamber. The reverse current absorbing body was fixed by welding such that its top was located at a position of 10 mm from the top of the current collector. The reverse current absorbing body was installed horizontally long. The distance between the bottom of the reverse current absorbing body and the bottom of the current collector was 47 mm.

Subsequently, the current collector was covered with the cathode in a state where the bent portion of the cathode was toward the current collector. Then, the four corners of the cathode were fixed to the current collector with a string fabricated with Teflon®. An EPDM (ethylene propylene diene) rubber gasket was used as the gasket. "Aciplex"® F6801 (manufactured by Asahi Kasei Chemicals Corporation) was used as the ion exchange membrane.

Salt electrolysis was performed using the electrolytic cell described above. The concentration of salt water (concentration of sodium chloride) in the anode chamber was adjusted to 205 g/L. The concentration of sodium hydroxide in the cathode chamber was adjusted to 32% by weight. The temperature of each of the anode chamber and the cathode chamber was adjusted such that the temperature inside each of the electrolytic cells was 90° C.

The electrolysis of salt was performed for 2 hours at a current density of 6 kA/m² and then the current density was dropped to 0 kA/m² at once. Thereafter, the plus and the minus of the rectifier terminals were switched, and the electric current (reverse current) in the direction opposite to the electrolysis was applied to the electrolytic cell. The reverse current was allowed to flow for 15 minutes with its current density set to 50 A/m². The electric potential of the cathode with respect to the Ag|AgCl reference electrode was measured using a Luggin tube introduced into the cathode chamber while the reverse current flowed.

As a result of measuring the residual rate of ruthenium after the electrolysis test by XRF, the remaining amount of ruthenium was 99% or more at all positions within the cathode surface. In this context, the XRF measurement positions were determined as 30 measurement positions in a size of 95 mm in length×110 mm in width by performing proportion calculation so as to correspond to the 30 measurement positions shown in FIG. 9 (1150 mm in length× 2380 mm in width).

Thereafter, the damage of the membrane was examined by carrying out the electrolysis at a current density of 6 kA/m² for half a year. The damage of the ion exchange membrane was examined at a site facing the portion in which the reverse current absorbing body was installed, and the other sites. The number of damaged places was converted to that for a large size from the ratio between the electrolytic area of the electrolytic cell used in this Example and the electrolytic area of the electrolytic cell in a large size electrolyzer, and was consequently Δ in Example 14.

The test results about Examples 1 to 14, Example 4-1, Comparative Example 1 and Comparative Example 1-1 were summarized in Table 11. In each example, the numeric value (%) obtained by dividing total area S' of the opening portion in the cathode-facing surface of the reverse current absorbing body by area S" of the cathode-facing surface of the reverse current absorbing body obtained by including the opening portion in the area (100×S'/S") was less than 90%. Therefore, the opening portion was also included in the area as to S3 and $S_A$.

As is evident, the value of the measurement A after the electrolysis test increases as the value of $S3/S_A$ increases. The value of the measurement A was 5% when $S3/S_h$ was 0, 90% when $S3/S_A$ was 0.20, and 98% or more when $S3/S_A$ was 0.36 or more.

On the other hand, as is evident, the frequency of the occurrence of membrane damage decreases as the value of $S3/S_A$ decreases. The frequency of the occurrence of membrane damage was high (X) when $S3/S_A$ was 1.00, Δ when $S3/S_A$ was 0.79, and ○ when $S3/S_A$ was 0.36 or less.

The optimum range of the $S3/S_A$ value in view of both the residual rate of the coating and membrane damage was found.

TABLE 11

| | $S3/S_A$ | Relationship between S3 and S4 | Measurement A/% | Measurement B/% | Frequency of occurrence of membrane damage |
|---|---|---|---|---|---|
| Example 1 | 0.40 | S4 < S3 | 98 | 99 | ○ |
| Example 2 | 0.40 | S4 < S3 | 100 | 100 | ○ |
| Example 3 | 0.40 | S4 < S3 | 100 | 100 | ○ |
| Example 4 | 0.36 | S4 < S3 | 99 | 99 | ○ |
| Example 4-1 | 0.20 | S4 = S3 | 90 | — | ○ |
| Comparative Example 1 | 0.00 | — | 5 | — | ○ |
| Comparative Example 1-1 | 1.00 | S4 = S3 | 100 | — | X |
| Example 5 | 0.56 | S4 < S3 | 100 | — | ○ |
| Example 6 | 0 56 | S4 < S3 | 100 | — | ○ |
| Example 7 | 0.56 | S4 < S3 | 100 | — | ○ |
| Example 8 | 0.56 | S4 < S3 | 100 | — | ○ |
| Example 9 | 0.56 | S4 < S3 | 100 | — | ○ |
| Example 10 | 0.56 | S4 < S3 | 100 | — | ○ |
| Example 11 | 0.56 | S4 < S3 | 100 | — | ○ |
| Example 12 | 0.56 | S4 < S3 | 100 | — | ○ |
| Example 13 | 0.36 | S4 < S3 | 100 | — | ○ |
| Example 14 | 0.79 | S4 < S3 | 99 | — | Δ |

Example 15

Nickel expanded metal was used as a metal porous plate. The nickel plate having a thickness of 1 mm was processed a. SW=3, LW=4, and feed=1. The thickness after the processing was 1.2 mm. This nickel expanded metal was blast treated with steel grit (particle No. 70, particle size range: 420 μm, to 1000 μm).

An aqueous solution of nickel(II) nitrate hexahydrate (Wako Pure Chemical Industries, Ltd., special grade) dissolved in pure water was prepared as a coating liquid. The concentration of the nickel element in the coating liquid was 230 g/L. This aqueous solution was applied to the nickel expanded metal with a brush, then dried at 75° C. for 10 minutes, and calcinated at 500° C. for 10 minutes. This series of operations of application, drying, and calcinating was repeated until a predetermined amount of nickel applied was obtained. Thereafter, a part of the coating was peeled off, and the measurement of X-ray diffraction was carried out. As a result, only the diffraction line of nickel oxide was observed. It was thus confirmed that nickel was applied as nickel oxide. The amount of nickel oxide applied was 373 g/m². Subsequently, a hydrogen reduction treatment was carried out at 200° C. in a hydrogen atmosphere (diluted with nitrogen).

The time T to reach −0.1 V vs. Ag/AgCl was 723 seconds, and the quantity of the reverse current absorbed was 180750 C/m². Also, the full width at half maximum of the X-ray diffraction of Ni metal was 0.39°, the degree X of oxidation was 99%, the degree Y of oxidation was 3.8%, the specific surface area was 3.9 m²/g, and the proportion of the pore volume of the pores having a pore size of 10 nm or greater to the total pore volume was 86% (Table 12).

The electrolysis test was carried out in the same manner as in Example 14, and then, the residual rate of ruthenium after the electrolysis test was measured by XRF. The measurement points were 5 points shown in FIG. 21 (measurement C). The remaining amount of ruthenium was 99% or more at all the positions within the cathode surface. The damage of the ion exchange membrane was examined at a site facing the portion in which the reverse current absorbing body was installed, and the other sites, but was ○ in Example 15. The reverse current absorbing body was able to be also produced by the thermal decomposition method using a solution containing nickel.

Example 16

Coating was carried out using the same substrate and nickel nitrate coating liquid as those of Example 15. A part of the coating was peeled off, and the measurement of X-ray diffraction was carried out. As a result, only the diffraction line of nickel oxide was observed. Thus, nickel was applied as nickel oxide, and the amount of nickel oxide applied was 852 g/m². Subsequently, a hydrogen reduction treatment was carried out at 200° C. in a hydrogen atmosphere (diluted with nitrogen).

The time T to reach −0.1 V vs. Ag/AgCl was 1210 seconds, and the quantity of the reverse current absorbed was 302500 C/m². Also, the full width at half maximum of the X-ray diffraction of Ni metal was 0.36°, the degree X of oxidation was 99%, the degree Y of oxidation was 1.5%, the specific surface area was 4.2 m²/g, and the proportion of the pore volume of the pores having a pore size of 1.0 nm or greater to the total pore volume was 85% (Table 12).

The electrolysis test was carried out in the same manner as in Example 15, and then, the residual rate of ruthenium after the electrolysis test was measured by XRF. As a result, the remaining amount of ruthenium was 99% or more at all the positions within the cathode surface. The damage of the ion exchange membrane was examined at a site facing the portion in which the reverse current absorbing body was installed, and the other sites, but was ○ in Example 16.

The reverse current absorbing body was able to be also produced by the thermal decomposition method using a solution containing nickel.

The predetermined physical property values measured in Examples 1, 5 to 12, 15 and 16 are collectively shown in Table 12 below.

TABLE 12

| | Quantity of reverse current absorbed C/m² | Full width at half maximum of X-ray diffraction of Ni metal/° | Specific surface area of reverse current absorbing layer m²/g | Proportion of pore volume of pores having pore size of 10 nm or greater to total pore volume/% | Degree X of oxidation/% | Degree Y of oxidation/% |
|---|---|---|---|---|---|---|
| Example 1  | 558500 | 0.33 | 3.3 | 94 | 78 | 3.3 |
| Example 5  | 217750 | 0.32 | 1.5 | 90 | 80 | 51 |
| Example 6  | 262750 | 0.32 | 1.7 | 91 | 80 | 57 |
| Example 7  | 243000 | 0.34 | 1.7 | 91 | 80 | 52 |
| Example 8  | 234500 | 0.36 | 1.9 | 93 | 80 | 2.5 |
| Example 9  | 254250 | 0.34 | 1.6 | 90 | 81 | 55 |
| Example 10 | 258000 | 0.45 | 2.0 | 92 | 81 | 2.4 |
| Example 11 | 187750 | 0.36 | 1.6 | 90 | 81 | 56 |
| Example 12 | 274500 | 0.33 | 1.8 | 90 | 81 | 1.8 |
| Example 15 | 180750 | 0.39 | 3.9 | 86 | 99 | 3.8 |
| Example 16 | 302500 | 0.36 | 4.2 | 85 | 99 | 1.5 |

Example 15-1

The test was carried out using the same electrolytic cell as that of Example 14. The reverse current absorbing body produced in Example 15 was cut into strip-like shape of 37 mm in length and 110 mm in width and fixed to the current collector of the cathode chamber. The reverse current absorbing body was fixed by welding such that its top was located at a position of 20 mm from the top of the current collector. The reverse current absorbing body was installed horizontally long. The distance between the bottom of the reverse current absorbing body and the bottom of the current collector was 38 mm. The height at the installation position of the reverse current absorbing body was substantially similar to that at the position of Example 5. The electrolysis test was carried out in the same manner as in Example 15, and then, the residual rate of ruthenium after the electrolysis test was measured by XRF. As a result, the remaining amount of ruthenium was 99% or more at all the positions within the cathode surface. The reverse current absorbing body was able to be also produced by the thermal decomposition method using a solution containing nickel. The damage of the ion exchange membrane was examined at a site facing the portion in which the reverse current absorbing body was installed, and the other sites, but was ○ in Example 15-1.

Example 16-1

The test was carried out using the same electrolytic cell as that of Example 14. The reverse current absorbing body produced in Example 16 was cut into strip-like shape of 37 mm in length and 110 mm in width and fixed to the current collector of the cathode chamber. The reverse current absorbing body was fixed by welding such that its top was located at a position of 20 mm from the top of the current collector. The reverse current absorbing body was installed horizontally long. The distance between the bottom of the reverse current absorbing body and the bottom of the current collector was 38 mm. The height at the installation position of the reverse current absorbing body was substantially similar to that at the position of Example 5. The electrolysis test was carried out in the same manner as in Example 15, and then, the residual rate of ruthenium after the electrolysis test was measured by XRF. As a result, the remaining amount of ruthenium was 99% or more at all the positions within the cathode surface. The reverse current absorbing body was able to be also produced by the thermal decomposition method using a solution containing nickel. The damage of the ion exchange membrane was examined at a site facing the portion in which the reverse current absorbing body was installed, and the other sites, but was ○ in Example 16-1.

Comparative Example 2

The following electrolysis experiment was carried out to measure an electric potential distribution in the vertical direction of the cathode when the reverse current flowed. The electrolytic cell was fabricated with a transparent acrylic material in order to observe the inside of the anode chamber and the inside of the cathode chamber of the electrolytic cell from the outside. An anode cell having an anode chamber installed with an anode (anode terminal cell) and a cathode cell having a cathode chamber installed with a cathode (cathode terminal cell) were combined to face each other. A pair of gaskets was disposed between the cells, and an ion exchange membrane was sandwiched between the pair of gaskets. Then, the anode cell, the gasket, the ion exchange membrane, the gasket, and the cathode were tightly attached to obtain an electrolytic cell. The electrolytic cell had a structure where the sizes of the anode, the cathode and the current collector were a horizontal length of 95 mm and a longitudinal length of 1160 mm and faced each other in parallel.

A woven fabric prepared using nickel wire of 0.1 mm and processed into wave shape was fixed as the cushion mat to the current collector by spot welding to obtain a cathode chamber. A 40-mesh wire mesh with a line shape of 0.15 mm coated with ruthenium as a main component was laminated and fixed as the cathode for hydrogen generation onto the cushion mat.

So-called DSA®, a titanium substrate coated with an oxide having ruthenium, iridium, and titanium as a component, was used as the anode. "Aciplex"® F6801 (manufactured by Asahi Kasei Chemicals Corporation) was used as the ion exchange membrane.

Luggin tubes were installed in order to measure the electrode potentials of the anode and the cathode. Three Luggin tubes were installed at positions of 140 mm, 578 mm, and 1100 mm, respectively, from the top of the anode in the anode chamber. Six Luggin tubes were installed at positions of 50 nm, 200 mm, 350 mm, 578 mm, 870 mm, and 1100 mm, respectively, from the top of the cathode in the cathode chamber. A silver-silver chloride electrode (saturated KCl) was used as a reference electrode. ScopeCorder SL1400 (Yokogawa Electric Corporation) was used in the measurement and recording of the electrode potentials.

Salt electrolysis was carried out at a current density of 4 kA/m$^2$ while adjustment was made such that the NaCl concentration of the anode chamber exit was 3.5 N, and the NaOH concentration of the cathode chamber exit was 32% by weight. The electrolysis was stopped after 2 hours from the start of the electrolysis. The anode and the cathode were electrically short circuited with a resistor of 0.5Ω, and the reverse current was allowed to flow.

FIG. 15(A) shows the electric potentials of the anode and the cathode with respect to the silver-silver chloride electrode immediately after the short circuit with the resistor. FIG. 15(B) shows the electric potentials of the anode and the cathode with respect to the silver-silver chloride electrode after 6 minutes from the short circuit with the resistor.

As is evident from these drawings, the electric potential of the cathode elevated more rapidly in a portion closer to the top of the electrolytic cell. This suggested that the electric potential of the cathode more rapidly reaches −0.1 V vs. Ag/AgCl which is the electric potential at which the catalytic component ruthenium is dissolved, to start the oxidative dissolution of ruthenium. As a result of actually observing the inside of the cathode chamber through the transparent acrylic cell, the upper portion of the cathode was colored brown. Thus, it was able to be visually confirmed that the dissolution of ruthenium was already started. The state short circuited with the resistor was maintained for 40 minutes, and then, the electrolytic cell was dismantled. The amount of ruthenium was measured before and after the test of Comparative Example 2 using a handy type fluorescent X-ray analysis apparatus (Niton XL3t-800S, Thermo Fisher Scientific Inc.) to calculate the residual rate of ruthenium. As shown in FIG. 16, the residual rate of ruthenium was decreased in the upper portion of the cathode.

Example 17

The electrolysis test was carried out using the same electrolytic cell as that of Comparative Example 2. The reverse current absorbing body produced in the same manner as in Example 1 and cut into a size of 95 mm in width and 230 mm in height was attached by TIG welding such that the top of the reverse current absorbing body was positioned 365 mm from the top of the current collector installed in the cathode chamber of the electrolytic cell.

The electrolysis test was carried out in the same manner as in Comparative Example 2. FIG. 17(A) shows the electric potentials of the anode and the cathode with respect to the silver-silver chloride electrode immediately after the short circuit with the resistor. FIG. 17(B) shows the electric potentials of the anode and the cathode with respect to the silver-silver chloride electrode after 15 minutes from the short circuit with the resistor. FIG. 18(A) shows the electric potentials of the anode and the cathode with respect to the silver-silver chloride electrode after 39 minutes from the short circuit with the resistor. FIG. 18(B) shows the electric potentials of the anode and the cathode with respect to the silver-silver chloride electrode after 119 minutes from the short circuit with the resistor.

As is evident from these drawings, the cathode exhibited an electric potential curve in which the electric potential was minimal around 365 mm to 595 mm where the reverse current absorbing body was installed. The electric potential of the whole cathode then elevated gradually and became almost the same potential as a whole after 119 minutes, reaching −0.1 V vs. Ag/AgCl which was the electric potential at which ruthenium was dissolved. Although the inside of the cathode chamber was observed through the transparent acrylic cell, the clear dissolution of ruthenium was unable to be visually confirmed. The state short circuited with the resistor was maintained for 142 minutes, and then, the electrolytic cell was dismantled. The amount of ruthenium was measured before and after the test of Example 17 using a handy type fluorescent X-ray analysis apparatus (Niton XL3t-800S, Thermo Fisher Scientific Inc.) to calculate the residual rate of ruthenium. As shown in FIG. 19, the cathode coating remained with an even residual rate in the upper and lower portions of the cathode.

Reference Example 17-1

The electrolysis test was carried out using the same electrolytic cell as that of Comparative Example 2. The reverse current absorbing body produced in the same manner as in Example 1 and cut into a size of 95 mm in width and 230 mm in height was attached by TIG welding such that the top of the reverse current absorbing body was positioned 930 mm from the top of the current collector installed in the cathode chamber of the electrolytic cell. In other words, the reverse current absorbing body was attached to a position that allowed its bottom to overlap the bottom of the current collector.

The electrolysis test was carried out in the same manner as in Comparative Example 2. FIG. 20(A) shows the electric potentials of the anode and the cathode with respect to the silver-silver chloride electrode immediately after the short circuit with the resistor. FIG. 20(B) shows the electric potentials of the anode and the cathode with respect to the silver-silver chloride electrode after 11 minutes from the short circuit with the resistor. FIG. 20(C) shows the electric potentials of the anode and the cathode with respect to the silver-silver chloride electrode after 79 minutes from the short circuit with the resistor.

As is evident from these drawings, the electric potential of the cathode hardly elevated around 930 mm to 1160 mm where the reverse current absorbing body was installed, and elevated rapidly in the upper portion of the cathode, reaching, in the upper portion, −0.1 V vs. Ag/AgCl which was the electric potential at which ruthenium was dissolved. As a result of actually observing the inside of the cathode chamber through the transparent acrylic cell, the upper portion of the cathode was slightly colored brown. Thus, it was able to be visually confirmed that the dissolution of ruthenium was already started. The state short circuited with the resistor was maintained for 84 minutes, and then, the electrolytic cell was dismantled. The cathode potential was able to be prevented from becoming noble, as compared to Comparative Example 2.

Example 18

The test was carried out using the same electrolytic cell as that of Example 14. The reverse current absorbing body used was produced the same manner as in Example 12 and cut into strip-like shape of 37 mm in length and 110 mm in width. The reverse current absorbing body was installed on a cushion mat and fixed by welding such that the top of the reverse current absorbing body was located at a position of 20 mm from the top of the current collector. The reverse current absorbing body was installed horizontally long. The distance between the bottom of the reverse current absorbing body and the bottom of the current collector was 38 mm. The height at the installation position of the reverse current absorbing body was substantially similar to that at the position of Example 5.

In this Example, the reverse current absorbing body was installed between the cushion mat of the metal elastic body and the cathode. The distance between the anode and the reverse current absorbing body was about 0.3 mm.

The electrolysis test was carried out in the same manner as in Example 15, and the residual rate of ruthenium after the electrolysis test was measured by XRF. As a result, the remaining amount of ruthenium was 99% or more at all the positions within the cathode surface, and the average value was also 99% or more. The damage of the ion exchange membrane was examined at a site facing the portion in which the reverse current absorbing body was installed, and the other sites, but was ○ in Example 18.

Example 19

The reverse current absorbing body was produced in the same manner as in Example 12, and two such reverse current absorbing bodies cut into strip-like shape of 17 mm in length and 110 mm in width were prepared.

The same electrolytic cell as that of Example 14 was used, and the positions of the reverse current absorbing bodies were changed. The reverse current absorbing bodies were fixed to the current collector of the cathode chamber. One of the reverse current absorbing bodies was fixed to a position of 20 mm from the top of the current collector, and the other reverse current absorbing body was fixed to a position of 20 mm from the bottom of the current collector. Both the reverse current absorbing bodies were fixed horizontally long.

The electrolysis test was carried out in the same manner as in Example 15, and then, the residual rate of ruthenium after the electrolysis test was measured by XRF. As a result, the remaining amount of ruthenium was 99% or more at all the positions within the cathode surface, and the average value was also 99% or more. The damage of the ion exchange membrane was examined at a site facing the portion in which the reverse current absorbing body was installed, and the other sites, but was ○ in Example 19.

Example 20

The reverse current absorbing body was produced in the same manner as in Example 12, and two such reverse current absorbing bodies cut into strip-like shape of 95 mm in length and 20 m, in width were prepared.

The same electrolytic cell as that of Example 14 was used, and the positions of the reverse current absorbing bodies were changed. The reverse current absorbing bodies were fixed to the current collector of the cathode chamber. One of the reverse current absorbing bodies was fixed to a position of 20 mm from the left end of the current collector, and the other reverse current absorbing body was fixed to a position of 20 mm from the right end of the current collector. Both the reverse current absorbing bodies were fixed horizontally long.

The electrolysis test was carried out in the same manner as in Example 15, and then, the residual rate of ruthenium after the electrolysis test was measured by XRF. As a result, the remaining amount of ruthenium was 99% or more at all the positions within the cathode surface, and the average value was also 99% or more. The damage of the ion exchange membrane was examined at a site facing the portion in which the reverse current absorbing body was installed, and the other sites, but was ○ in Example 20.

(Relationship Between Remaining Amount and Elevation of Voltage)

The same electrolytic cell as that of Example 18 mentioned above was used. The electrolysis test was carried out in the same manner as in Example 18 except that: no reverse current absorbing body was installed; the current density was set to 4 kA/m$^2$; and the time for which the reverse current flowed was changed (8 patterns). Eight samples of the electrolytic cell after the electrolysis test were obtained in this manner. The average value of the residual rates of ruthenium at 5 points (shown in FIG. 21) was measured as to these samples and was consequently 100%, 90%, 81%, 48%, 26%, 21%, 12%, and 5% in the order of a shorter time for which the reverse current flowed. The cathode was re-attached to the electrolytic cell. Adjustment was made such that the current density was 4 kA/m$^2$, the salt water concentration (sodium chloride concentration) of the anode chamber was 205 g/L, the sodium hydroxide concentration of the cathode chamber was 32% by weight, and the temperature inside the electrolytic cell was 90° C. The electrolysis was carried out, and the voltage was measured. The results of confirming the relationship between the residual rate of ruthenium after the electrolysis test and the elevation of the voltage in this manner are shown in Table 13 below.

The elevation of the voltage was calculated by measuring and comparing the average voltage of 20 minutes before and after the electrolysis test. The voltage measurement was performed using a data logger (TRV-1000, manufactured by Keyence Corporation). The voltage was measured at 5-second intervals for 20 minutes, and the obtained values were averaged.

TABLE 13

| Amount of Ru coating (average value)/% | Elevation of voltage/mV (4 kA/m$^2$) |
|---|---|
| 100 | 0 |
| 90 | 2 |
| 81 | 6 |
| 48 | 5 |
| 26 | 0 |
| 21 | 12 |
| 12 | 49 |
| 5 | 251 |

Example 21

The reverse current absorbing body was produced by the thermal decomposition method in the same manner as in Example 15 except that an aqueous solution of iron(III) nitrate nonahydrate (Wako Pure Chemical industries, Ltd., special grade) dissolved in pure water was used as the coating liquid. The concentration of the iron element in the coating liquid was 230 g/L. A part of the coating was peeled off, and the measurement of X-ray diffraction was carried out. As a result, only the diffraction line of iron oxide was observed. It was thus confirmed that iron was applied as iron oxide. The amount of iron oxide applied was 411 g/m$^2$. Subsequently, a hydrogen reduction treatment was carried out at 200° C. in a hydrogen atmosphere (diluted with nitrogen).

The time T to reach −0.1 V vs. Ag/AgCl was 72 seconds, and the quantity of the reverse current absorbed was 18000 C/m².

The test was carried out using the same electrolytic cell as that of Example 14. The reverse current absorbing body was cut into strip-like shape of 37 mm in length and 110 mm in width and fixed to the current collector of the cathode chamber. The reverse current absorbing body was fixed by welding such that its top was located at a position of 20 mm from the top of the current collector. The reverse current absorbing body was installed horizontally long. The distance between the bottom of the reverse current absorbing body and the bottom of the current collector was 38 mm. The height at the installation position of the reverse current absorbing body was substantially similar to that at the position of Example 5. The electrolysis test was carried out in the same manner as in Example 15, and then, the residual rate of ruthenium after the electrolysis test was measured by XRF. As a result, the remaining amount of ruthenium was 67% or more at all the positions within the cathode surface. The damage of the ion exchange membrane was examined at a site facing the portion in which the reverse current absorbing body was installed, and the other sites, but was ○ in Example 21. The reverse current absorbing body was able to be also produced by the thermal decomposition method using a solution containing iron.

Example 22

The reverse current absorbing body was produced by the thermal decomposition method in the same manner as in Example 15 except that an aqueous solution of cobalt(II) nitrate hexahydrate (Wako Pure Chemical Industries, Ltd., special grade) dissolved in pure water was used as the coating liquid. The concentration of the cobalt element in the coating liquid was 115 g/L. A part of the coating was peeled off, and the measurement of X-ray diffraction was carried out. As a result, only the diffraction line of cobalt oxide was observed. It was thus confirmed that cobalt was applied as cobalt oxide. The amount of cobalt oxide applied was 405 g/m². Subsequently, a hydrogen reduction treatment was carried out at 200° C. in a hydrogen atmosphere (diluted with nitrogen).

The time T to reach −0.1 V vs. Ag/AgCl was 2133 seconds, and the quantity of the reverse current absorbed was 533250 C/m².

The test was carried out using the same electrolytic cell as that of Example 14. The reverse current absorbing body was cut into strip-like shape of 37 mm in length and 110 mm in width and fixed to the current collector of the cathode chamber. The reverse current absorbing body was fixed by welding such that its top was located at a position of 20 mm from the top of the current collector. The reverse current absorbing body was installed horizontally long. The distance between the bottom of the reverse current absorbing body and the bottom of the current collector was 38 mm. The height at the installation position of the reverse current absorbing body was substantially similar to that at the position of Example 5. The electrolysis test was carried out in the same manner as in Example 15, and then, the residual rate of ruthenium after the electrolysis test was measured by XRF. As a result, the remaining amount of ruthenium was 99% or more at all the positions within the cathode surface. The damage of the ion exchange membrane was examined at a site facing the portion in which the reverse current absorbing body was installed, and the other sites, but was ○ in Example 22. The reverse current absorbing body was able to be also produced by the thermal decomposition method using a solution containing cobalt.

The results of conducting evaluation related to the area ratio, the measurement C and the presence or absence of membrane damage in Examples 15 to 22 are collectively shown in Table 14.

TABLE 14

| | $S3/S_A$ | Relationship between S3 and S4 | Measurement C/% | Frequency of occurrence of membrane damage |
|---|---|---|---|---|
| Example 15 | 0.58 | S4 < S3 | 99 | ○ |
| Example 16 | 0.58 | S4 < S3 | 99 | ○ |
| Example 15-1 | 0.58 | S4 < S3 | 99 | ○ |
| Example 16-1 | 0.58 | S4 < S3 | 99 | ○ |
| Example 18 | 0.58 | S4 < S3 | 99 | ○ |
| Example 19 | 0.36 | S4 = S3 | 99 | ○ |
| Example 20 | 0.36 | S4 = S3 | 99 | ○ |
| Comparative Example 2 | 0.00 | — | — | — |
| Example 17 | 0.37 | S4 < S3 | — | — |
| Reference Example 17-1 | 0.00 | S4 > S3 | — | — |
| Example 21 | 0.58 | S4 < S3 | 67 | ○ |
| Example 22 | 0.58 | S4 < S3 | 99 | ○ |

The present application claims the priority based on Japanese Patent Application No. 2017-047272 filed on Mar. 13, 2017, the contents of which are incorporated herein by reference.

The invention claimed is:

1. An electrolytic cell comprising a cathode chamber, the cathode chamber comprising:
   a cathode; and
   a reverse current absorbing member comprising a substrate and a reverse current absorbing body, the reverse current absorbing member being disposed to face the cathode,
   wherein:
   the cathode and the reverse current absorbing body are electrically connected, and
   when a height at a bottom of the cathode chamber is defined as 0 and a height at a top of the cathode chamber is defined as h, a ratio of area S3 of the reverse current absorbing body present at position I corresponding to a height of h/2 or more and h or less to area $S_A$ of a cathode-facing surface of the substrate corresponding to the position I satisfies $0.36 \leq S3/S_A \leq 0.79$; and
   a relationship between area S4 of the reverse current absorbing body present at position II corresponding to a height of 0 or more and less than ½h, and the area S3 in the electrolytic cell satisfies S4<S3.

2. The electrolytic cell according to claim 1, wherein the reverse current absorbing body comprises an element having an oxidation-reduction potential less noble than that of a catalytic element of the cathode.

3. The electrolytic cell according to claim 1, wherein the reverse current absorbing body comprises at least one element selected from the group consisting of titanium, vanadium, chromium, manganese, iron, nickel, cobalt, copper, zinc, palladium, ruthenium and platinum.

4. The electrolytic cell according to claim 1, wherein
   the reverse current absorbing body is a porous body comprising a nickel element, and a full width at half maximum of a diffraction line peak of Ni metal at a diffraction angle 2θ=44.5° in a pattern obtained in powder X-ray diffraction of the porous body is 0.6° or less.

5. The electrolytic cell according to claim 1, wherein the reverse current absorbing body is a layer comprising Ni or NiO.

6. The electrolytic cell according to claim 1, wherein the reverse current absorbing body is a layer prepared by reducing the NiO.

7. The electrolytic cell according to claim 1, wherein
the substrate comprises a current collector, a support supporting the current collector, a partition wall, and a baffle plate,
the reverse current absorbing member further comprises a metal elastic body,
the metal elastic body is disposed between the current collector and the cathode,
the support is disposed between the current collector and the partition wall, and
the partition wall, the support, the current collector, the metal elastic body and the cathode are electrically connected.

8. The electrolytic cell according to claim 7, wherein at least a part of the reverse current absorbing body is disposed between the metal elastic body and the current collector.

9. The electrolytic cell according to claim 7, wherein at least a part of the reverse current absorbing body is disposed between the current collector and the partition wall.

10. The electrolytic cell according to claim 1, wherein
the reverse current absorbing body comprises a metal plate or a metal porous plate, and a reverse current absorbing layer formed on at least a part of a surface of the metal plate or the metal porous plate,
the substrate comprises a current collector, a support supporting the current collector, and a partition wall,
the reverse current absorbing member further comprises a metal elastic body,
the metal plate or the metal porous plate is disposed between the current collector and the cathode, or between the current collector and the partition wall, and
the metal plate or the metal porous plate, the partition wall, the support, the current collector, the metal elastic body and the cathode are electrically connected.

11. The electrolytic cell according to claim 1, wherein
the cathode chamber comprises, as the substrate, a partition wall and a cathode support supporting the cathode,
the cathode support is disposed between the cathode and the partition wall, and
the partition wall, the cathode support and the cathode are electrically connected.

12. The electrolytic cell according to claim 11, wherein at least a part of the reverse current absorbing body is disposed between the cathode and the partition wall.

13. The electrolytic cell according to claim 1, wherein at least a part of the substrate and/or the metal elastic body is a cube, a cuboid, a plate-like shape, a rod-like shape, a reticular shape, a disk-like shape or a spherical shape.

14. The electrolytic cell according to claim 1, wherein a specific surface area of the reverse current absorbing body is 0.01 to 100 m$^2$/g.

15. The electrolytic cell according to claim 1, wherein an electric quantity absorbed by the reverse current absorbing body is 1,000 to 2,000,000 C/m$^2$.

16. The electrolytic cell according to claim 1, wherein a sum of effective surface areas of the reverse current absorbing body is 10 to 100,000 m$^2$.

17. An electrolyzer comprising the electrolytic cell according to claim 1.

18. The electrolyzer according to claim 17, wherein a distance between an anode and the reverse current absorbing member in the electrolyzer is 35 mm to 0.1 mm.

19. A method for producing the electrolytic cell according to claim 1, comprising forming the reverse current absorbing body on the substrate or the metal elastic body to obtain the reverse current absorbing member,
wherein, after the forming, the ratio of the area S3 to the area $S_A$ satisfies $0.36 \leq S3/S_A \leq 0.79$.

* * * * *